US012725133B2

(12) United States Patent
Hong et al.

(10) Patent No.: US 12,725,133 B2
(45) Date of Patent: Sep. 1, 2026

(54) METHOD FOR PERSONALIZING VEHICLE LAMPS

(71) Applicants: HYUNDAI MOTOR COMPANY, Seoul (KR); KIA CORPORATION, Seoul (KR)

(72) Inventors: Seung-Pyo Hong, Incheon (KR); Da-Young Jeong, Seongnam-si (KR); Jung-Bin Kim, Bucheon-si (KR); Moon-Soo Park, Gwangmyeong-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 361 days.

(21) Appl. No.: 18/234,716

(22) Filed: Aug. 16, 2023

(65) Prior Publication Data

US 2024/0092253 A1 Mar. 21, 2024

(30) Foreign Application Priority Data

Sep. 19, 2022 (KR) ........................ 10-2022-0117777

(51) Int. Cl.
*G06Q 20/00* (2012.01)
*F21S 41/153* (2018.01)
(Continued)

(52) U.S. Cl.
CPC ............ *G06Q 20/00* (2013.01); *F21S 41/663* (2018.01); *G06T 7/30* (2017.01); *G06V 10/70* (2022.01);
(Continued)

(58) Field of Classification Search
CPC ........ G06Q 20/00; G06Q 50/184; G06T 7/30; F21S 41/663; F21S 41/153; G06V 10/70; G06V 10/72; G09G 2320/0626
See application file for complete search history.

(56) References Cited

U.S. PATENT DOCUMENTS

| | | | |
|---|---|---|---|
| 9,261,255 | B2 | 2/2016 | Kang |
| 2015/0043234 | A1 | 2/2015 | Kang |

(Continued)

FOREIGN PATENT DOCUMENTS

| | | | |
|---|---|---|---|
| KR | 20150017220 | A | 2/2015 |

OTHER PUBLICATIONS

Car Design: The Car of the Future in 7 Steps at https://www.bmw.com/en/design/car-design-in-7-steps.html (Year: 2018).*

*Primary Examiner* — Ming Shui
(74) *Attorney, Agent, or Firm* — Lempia Summerfield Katz LLC

(57) ABSTRACT

A method of personalizing a vehicle lamp includes drawing an image made up of a plurality of pixels that implement a vehicle lamp, based on an input by a user. The method also includes converting the drawn image into light-and-shade data that correspond to the pixels, respectively, multiplying a pixel light distribution value, corresponding to each pixel, by a weighted value based on the data resulting from the conversion, adding up results of the multiplication, and deriving total light distribution of the pixels that results when brightness of the vehicle lamp is the same as that of the drawn image. The method further includes comparing the derived total light distribution against a predetermined reference value and determining whether the derived total light distribution satisfies a predetermined light distribution ref-
(Continued)

erence, and applying the drawn image to the vehicle lamp when it is determined that a predetermined light distribution reference is satisfied.

29 Claims, 31 Drawing Sheets

(51) Int. Cl.

| | |
|---|---|
| ***F21S 41/663*** | (2018.01) |
| ***G06Q 50/18*** | (2012.01) |
| ***G06T 7/30*** | (2017.01) |
| ***G06V 10/70*** | (2022.01) |
| ***G06V 10/72*** | (2022.01) |

(52) U.S. Cl.

CPC ............. *G06V 10/72* (2022.01); *F21S 41/153* (2018.01); *G06Q 50/184* (2013.01); *G09G 2320/0626* (2013.01)

(56) References Cited

U.S. PATENT DOCUMENTS

2022/0055525 A1* 2/2022 Kanj ..................... F21S 41/675
2024/0283950 A1* 8/2024 Almehio .............. H04N 19/182

* cited by examiner

METHOD FOR PERSONALIZING VEHICLE LAMPS

CROSS-REFERENCE TO RELATED APPLICATION

This application claims the benefit of and priority to Korean Patent Application No. 10-2022-0117777, filed on Sep. 19, 2022, the entire contents of which are incorporated herein by reference.

FIELD

The present disclosure relates to a method for personalizing a vehicle lamp to satisfy laws for light distribution, which is associated with illumination of the outside of a vehicle.

BACKGROUND

The statements in this section merely provide background information related to the present disclosure and may not constitute prior art.

Vehicles typically have various lamps performing an illumination function for easily identifying an object positioned in the vicinity of the vehicle while the vehicle travels at night and a signaling function for alerting a neighboring vehicle or a pedestrian to a state where the vehicle travels. Standards and specifications for installing each of the lamps are stipulated in laws in such a manner as to ensure that each function of the lamp is sufficiently performed.

For example, laws for visible light distribution stipulate that a vehicle lamp should be designed in such a manner that a predetermined amount of light or larger is emitted to an area in a range from an angle of 45 degrees in one direction to an angle of 80 degrees in the other direction with respect to the vehicle lamp.

Typically, a head lamp, a fog lamp, or the like, that are installed in the vehicle mostly serve the purpose of performing the illumination function, and a turn-signal lamp, a tail lamp, a brake lamp, or the like, mostly serve the purpose of performing the signaling function. However, the lamps installed in the front and rear of the vehicle have a significant influence on the exterior appearance of front and rear surfaces of the vehicle, and thus serve to provide aesthetic impression associated with the entire design of the vehicle. Generally, technologies for securing light collection and light diffusion levels have been developed in the past. In recent years, technologies for emphasizing features of illumination in terms of design have been under development.

However, optical efficiency is decreased, and thus laws or the like for light distribution cannot be obeyed, in some cases where various types of lamps, such as surface-mounted lights are installed for the reason of the design of the lamp in the form of multiple dots that performs the existing function in order to emphasize features of the lamp in terms of design. In order to solve this problem, technologies associated with an optical module that not only add design elements, but also realize an image of a surface-mounted light that is capable of obeying the laws for light distribution have been under development.

In recent years, with the increasing demand for personalized design emphasizing personal preference instead of a uniform design of the vehicle, there has been a demand for technologies that enable an illumination device and the like installed in the vehicle to emphasize the personality of a driver.

For example, an ambient light that is installed inside the vehicle is personalized in such a manner as to emit light in a specific color or pattern according to input by a user.

However, technologies for personalizing illumination have not yet been applied to an external illumination device, such as the head lamp, that is installed on the outside of the vehicle.

Particularly, an external lamp, as described above, is subject to legal restrictions, such as laws for visible light distribution. Thus, when a design of personalized illumination is applied, the laws for light distribution should be obeyed.

SUMMARY

An object of the present disclosure, which is made in order to solve the above-mentioned problem, is to provide a method for personalizing a vehicle lamp capable of not only obeying laws applying to a lamp on the outside of a vehicle, such as laws for light distribution, but also satisfying the personality of a user.

According to an aspect of the present disclosure, a method for personalizing a vehicle lamp is provided. The method includes drawing an image made up of a plurality of pixels that implement a vehicle lamp based on an input by a user. The method also includes converting the drawn image into amount-of-color data that correspond to the pixels, respectively, by performing digital datafication thereof. The method additionally includes multiplying a pixel light distribution value, corresponding to each pixel, which results when the vehicle lamp is turned on in the form of the drawn image, by a weighted value based on the data resulting from the conversion, adding up results of the multiplication, and deriving total light distribution of the pixels that results when brightness of the turned-on vehicle lamp is in proportion to brightness of the drawn image. The method further includes comparing the derived total light distribution of the pixels against a predetermined reference value and determining whether or not the derived total light distribution of the pixels satisfies a predetermined light distribution reference. The method further still includes applying the drawn image to the vehicle lamp when it is determined that the derived total light distribution of the pixels satisfies the predetermined light distribution reference.

According to another aspect of the present disclosure, another method for personalizing a vehicle lamp is provided. The method includes drawing an image made up of a plurality of pixels that implement a vehicle lamp. The method also includes converting the drawn image into amount-of-color data that correspond to the pixels, respectively, by performing digital datafication thereof. The method further includes multiplying a pixel light distribution value, corresponding to each pixel, which results when the vehicle lamp is turned on in the form of the drawn image, by the data resulting from the conversion, then adding up results of the multiplication, and deriving total light distribution of the pixels. The method additionally includes comparing the derived total light distribution of the pixels against a predetermined reference value and determining whether the derived total light distribution of the pixels satisfies a predetermined light distribution reference. The method further still includes displaying the reason that the drawn image fails to satisfy the predetermined light distribution reference in a case where it is determined that the derived total light distribution of the pixels does not satisfy the predetermined light distribution reference.

According to still another aspect of the present disclosure, yet another method for personalizing a vehicle lamp is provided. The method includes drawing an image made up of a plurality of pixels that implement a vehicle lamp. The method also includes converting the drawn image into amount-of-color data that correspond to the pixels, respectively, by performing digital datafication thereof. The method further includes multiplying a pixel light distribution value, corresponding to each pixel, which results when the vehicle lamp is turned on in the form of the drawn image, by the data resulting from the conversion, adding up results of the multiplication, and deriving total light distribution of the pixels. The method also includes comparing the derived total light distribution of the pixels against a predetermined reference value and determining whether the derived total light distribution of the pixels satisfies a predetermined light distribution reference. The method additionally includes deriving a similarity image satisfying the predetermined light distribution reference, as an image similar to the drawn image, using a deep learning model, when it is determined that the derived total light distribution of the pixels does not satisfy the predetermined light distribution reference. The method further still includes applying the derived similarity image to the vehicle lamp.

In an embodiment, drawing the image, in response to the input by the user, may include drawing the image in accordance with a number of the pixels that implement the vehicle lamp.

In an embodiment, drawing the image may include obtaining a first image provided by the user, and drawing a second image by converting the first image into the plurality of pixels for rasterization.

In an embodiment, drawing the image may further include converting red, green, and blue (RGB) colors of the first image into gray scales of the pixels of the second image.

In an embodiment, the amount-of-color data may be values that are preset as data values that represent 256 levels, respectively, ranging from level zero (0) to level 255 and are stored.

The method may further include registering the derived image with an online platform by uploading thereto in a case where it is determined that the derived total light distribution of the pixels satisfies the predetermined light distribution reference; and matching copyright information and proprietary right information of the registered image with each other and issuing a non-fungible token (NFT), based on a blockchain, that provides a proprietary right to the registered image.

The method may further include receiving a request for use of the registered image from at least one terminal for service use, owned by the user, that is connected to a network based on the blockchain. The method may also include comparing the copyright information and the proprietary right information that are matched with the image the use of which is requested and information of the user with each other. The method may additionally include applying the image, the use of which is requested, to the vehicle lamp when the copyright information and the proprietary right information that are matched with the image, the use of which is requested, are consistent with the information of the user.

The method may further include receiving a request for use of the registered image from at least one terminal for service use, owned by the user, that is connected to a network based on the blockchain. The method may also include comparing the copyright information and the proprietary right information that are matched with the image the use of which is requested and information of the user with each other. The method may further include charging a usage fee for the use of the image to the user in a case where the copyright information and the proprietary right information that are matched with the image, the use of which is requested, are not consistent with the information of the user. The method may additionally include applying the image to the vehicle lamp of the user when it is determined that the usage fee for the use of the image is paid by the user. The method may further still include paying a usage fee for a service associated with the image to a creator of the image based on the charged usage fee.

In an embodiment, the NFT may be issued to an account for the online platform through which a proprietary right to the user's vehicle is identified.

The method may further include deriving a similarity image, as an image similar to the drawn image, that satisfies the predetermined light distribution reference, using a deep learning model, when it is determined that the derived total light distribution of the pixels does not satisfy the predetermined light distribution reference; and displaying the derived similarity image for the user's viewing and waiting for the user to re-input an image.

The method may further include re-deriving total light distribution of the pixels for the image re-input by the user, comparing the re-derived total light distribution of the pixels against the predetermined reference value, and determining whether the re-derived total light distribution of the pixels satisfies the predetermined light distribution reference. The method may additionally include applying the re-input image to the vehicle lamp when it is determined that the re-derived total light distribution of the pixels satisfies the predetermined light distribution reference.

The method may further include receiving a request for use of an image registered with an online platform from at least one terminal for service use, owned by the user, that is connected to a network based on a blockchain in a case where it is determined that the derived total light distribution of the pixels does not satisfy the predetermined light distribution reference. The method may also include comparing copyright information and proprietary right information that are matched with the image the use of which is requested and information of the user with each other; charging a usage fee for the use of the image to the user in a case where the copyright information and the proprietary right information that are matched with the image, the use of which is requested, are not consistent with the information of the user. The method may further include applying the image to the vehicle lamp of the user when it is determined that the usage fee for the use of the image is paid by the user; and paying a usage fee for a service associated with the image to a creator of the image based on the charged usage fee.

In an embodiment, the vehicle lamp may perform at least one of a low-beam function, a high-beam function, a sub-low-beam function, a backup function, a daytime running light (DRL) display function, a position display function, a direction indication function, a vehicle-stop display function, or an emergency display function, or a combination thereof.

According to embodiments of the present disclosure, the image corresponding to the pixels that constitute the vehicle lamp mounted on the outside of the vehicle can be converted into data. Thus, a personalized image can be realized in various forms through the vehicle lamp by matching brightness with each of the pixels.

According to embodiments of the present disclosure, it can be quickly checked whether the drawn image can obey various regulations specified in laws associated. Thus, when the drawn image can obey the laws, the drawn image can be immediately applied to a corresponding vehicle model.

According to embodiments of the present disclosure, in a case where an image created by the user himself/herself obeys the laws, the non-fungible token (NFT) can be issued to the image and thus can be exclusively used. Accordingly, the desire to own the vehicle can be enhanced. In addition, in a case where another person uses the registered NFT, the usage fee can be paid to the creator of the image. The user who owns the vehicle can be provided with a profit generation model or a means of making a profit by selling or buying the NFT.

According to embodiments of the present disclosure, in a case where the drawn image does not obey the laws, a guide for obeying the laws can be provided, and technologies for personalization can be increasingly utilized. Although the vehicle lamp may be personalized, usually, it is difficult for the user to search for or create an image that can obey the complicated laws. Therefore, when a design created by the user fails to obey the laws, what is legally needed to obey the laws can be provided to the user. Thus, the user's accessibility to the technologies for personalization can be improved. In addition, the user can also easily configure a pattern that can obey the laws, through a completion mode in which the similarity image that is similar to the image that is input and can obey the laws is automatically generated and applied.

BRIEF DESCRIPTION OF THE DRAWINGS

FIG. 2 is a flowchart illustrating a method for personalizing a vehicle lamp, according to an embodiment.

DETAILED DESCRIPTION

Figure 1:
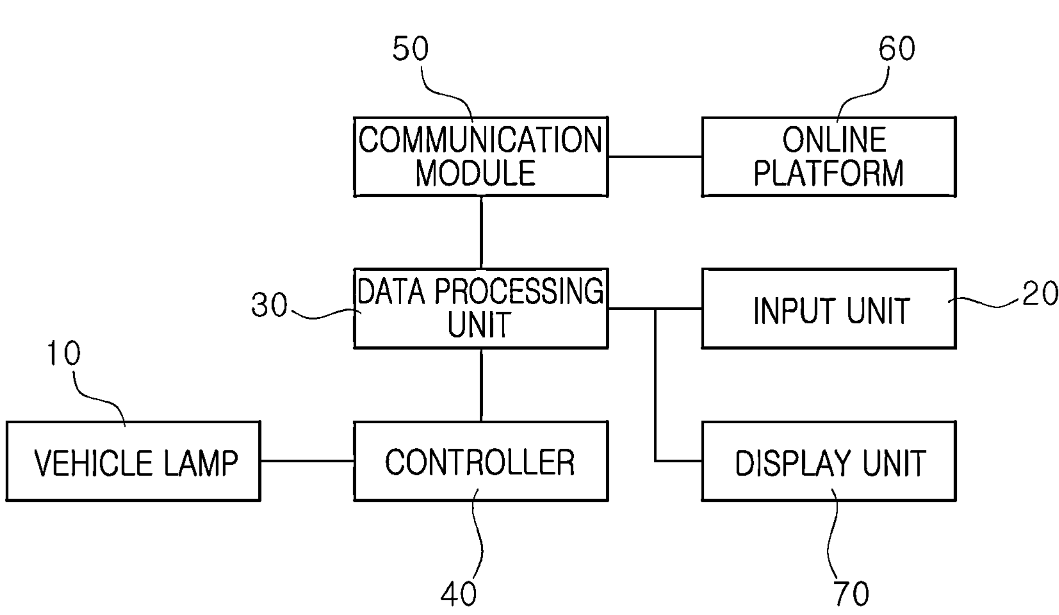
FIG. 1 is a block diagram illustrating a vehicle lamp system configured to implement a method for personalizing a vehicle lamp, according to an embodiment of the present disclosure.

Embodiments of the present disclosure are described below in detail below with reference to the accompanying drawings. It should be noted that, in assigning a reference numeral to a constituent element that is illustrated in the drawings, the same constituent element, although illustrated in different drawings, is designated by the same reference numeral, if possible, throughout the drawings. In addition, in the description, where it has been considered that a specific description of well-known features, configurations, or function may obscure the gist of the present disclosure, a detailed description thereof has been omitted.

When a component, device, element, or the like of the present disclosure is described as having a purpose or performing an operation, function, or the like, the component, device, or element should be considered herein as being "configured to" meet that purpose or perform that operation or function.

FIG. 1 is a block diagram illustrating a vehicle lamp system configured to implement a method for personalizing a vehicle lamp, according to an embodiment of the present disclosure.

With reference to FIG. 1, a vehicle lamp 10 may be an apparatus, such as an illumination apparatus that is configured with a plurality of pixels that are capable of being individually turned on, that realizes a drawn image by turning on the plurality of pixels at a predetermined luminance level. In an embodiment, the vehicle lamp 10 comprises a lamp that uses an LED and a microlens array (MLA) as a light source and a lens. However, the vehicle lamp 10 is not limited thereto.

For example, other types of lamps that are capable of being turned on a per-pixel basis for image realization and that use a plurality of LEDs and projection optics may be used as the vehicle lamp 10. In various embodiments, the vehicle lamp 10 comprises a lamp, such as a head lamp or a fog lamp, that has the purpose of performing illumination functions, such as a low beam function, a high beam function, and a sub-low-beam function. However, the vehicle lamp 10 is not limited thereto.

For example, the vehicle lamp 10 may be a lamp that performs at least one of a backup function of indicating vehicle backup, a function of indicating daytime running light (DRL), a function of indicating a position, a function of indicating a direction, a function of indicating that a vehicle stops, or a function of indicating an emergency, or a combination thereof.

The input unit 20 may be a device through which a user inputs the drawn image into a data processing unit 30. In an embodiment, the input unit 20 is a user interface for infotainment that is mounted inside a vehicle. Additionally or alternatively, the drawn image may be input through an input device, such as a universal serial bus (USB), that is installed in the vehicle, in the same manner as when uploading a specific image.

In some embodiments, instead of being directly input through the interface mounted inside the vehicle, an image may be uploaded via an over the air (OTA) interface to the data processing unit 30 provided in the vehicle. In such embodiments, the input unit 20 may be a smartphone owned by the user or an input device of a personal user terminal, such as a PC, for example. The input unit 20 may be connected to the data processing unit 30 through a wireless communication module 50 that complies with WiFi, LAN, LTE, or Bluetooth standards.

In addition to, or instead of, uploading the drawn image, the input unit 20 may perform a function of inputting a specific search word or command into an online platform 60 in order to use an image issued by a non-fungible token (NFT) or of inputting a user command in order to enable the data processing unit 30 or a controller 40 to perform a specific operation.

The data processing unit 30 serves as a unit for performing various types of data processing on the image input through the input unit 20. In an embodiment, the data processing unit 30 is configured to perform a method for personalizing a vehicle lamp according to an embodiment of the present disclosure.

As described in more detail below, the data processing unit 30 converts the drawn image, input through the input unit 20, into a secondary image made up of a plurality of pixels, which is realizable by the vehicle lamp 10 and digitally datafies the processed secondary image, thereby determining whether or not the processed secondary image obeys laws. When the processed secondary image does not obey the laws, the data processing unit 30 provides a guide for obeying the laws or performs processing that automatically generates an image that may obey the laws.

In an embodiment, the data processing unit 30 is a processing device, such as an electronic control unit (ECU) that is installed inside the vehicle. In this embodiment, the controller 40 and the data processing unit 30 may exchange data with each other through a controller area network (CAN) communication. In another embodiment, the data processing unit 30 may be an external processing device that is separately installed, e.g., by a vehicle manufacturer, outside a vehicle body. In this embodiment, the controller 40 and the data processing unit 30 may exchange data with each other through wireless mobile communication that complies with WiFi and 4G standards.

The controller 40 may be a unit that controls turning-on and turning-off of the vehicle lamp 10 in such a manner that the vehicle lamp 10 possibly realizes the drawn image according to a result of the determination by the data processing unit 30. In a case where the data processing unit 30 determines that the drawn image obeys the laws, or where an image is automatically generated in such a manner as to obey the laws, the controller 40 selects a group of pixels, which need to be turned on a per-pixel basis from among the plurality of pixels that constitute the vehicle lamp 10, in such a manner as to correspond to the secondary image resulting from the processing by the data processing unit 30. According to this selection, the controller 40 realizes the secondary image by controlling the vehicle lamp 10 to turn off a specific pixel or to turn on the remaining pixels and/or by adjusting a luminance level or the like of the pixel that is turned on.

The wireless communication module 50 may be a module that enables the data processing unit 30 to wirelessly communicate with the external online platform 60. In a case where the data processing unit 30 determines that the drawn image is an image that obeys the laws and is initially applied to the vehicle, the drawn image may be uploaded to a server for the online platform 60 through the wireless communication module 50. In an embodiment, the wireless communication module 50 may perform wireless communication over an LTE communication network, a LAN communication network, or the like.

A display unit 70 may be a device that performs a function of displaying a result of the processing by the data processing unit 30. In an embodiment, the display unit 70 performs a function of displaying, for the user's viewing, information on whether or not the image input through the input unit 20 obeys the laws, a guide for solving the problem of the image not obeying the laws, the generated image that obeys the laws, or the like.

In various embodiments, the display unit 70 may be a liquid crystal screen of a smartphone owned by the user, a display screen of an infotainment system of the vehicle, a monitor of a PC owned by the user, or the like.

The method for personalizing a vehicle lamp according to an embodiment of the present disclosure, which is performed by the data processing unit 30, is described in detail below with reference to the FIGS. 2 to 15.

Figure 2:
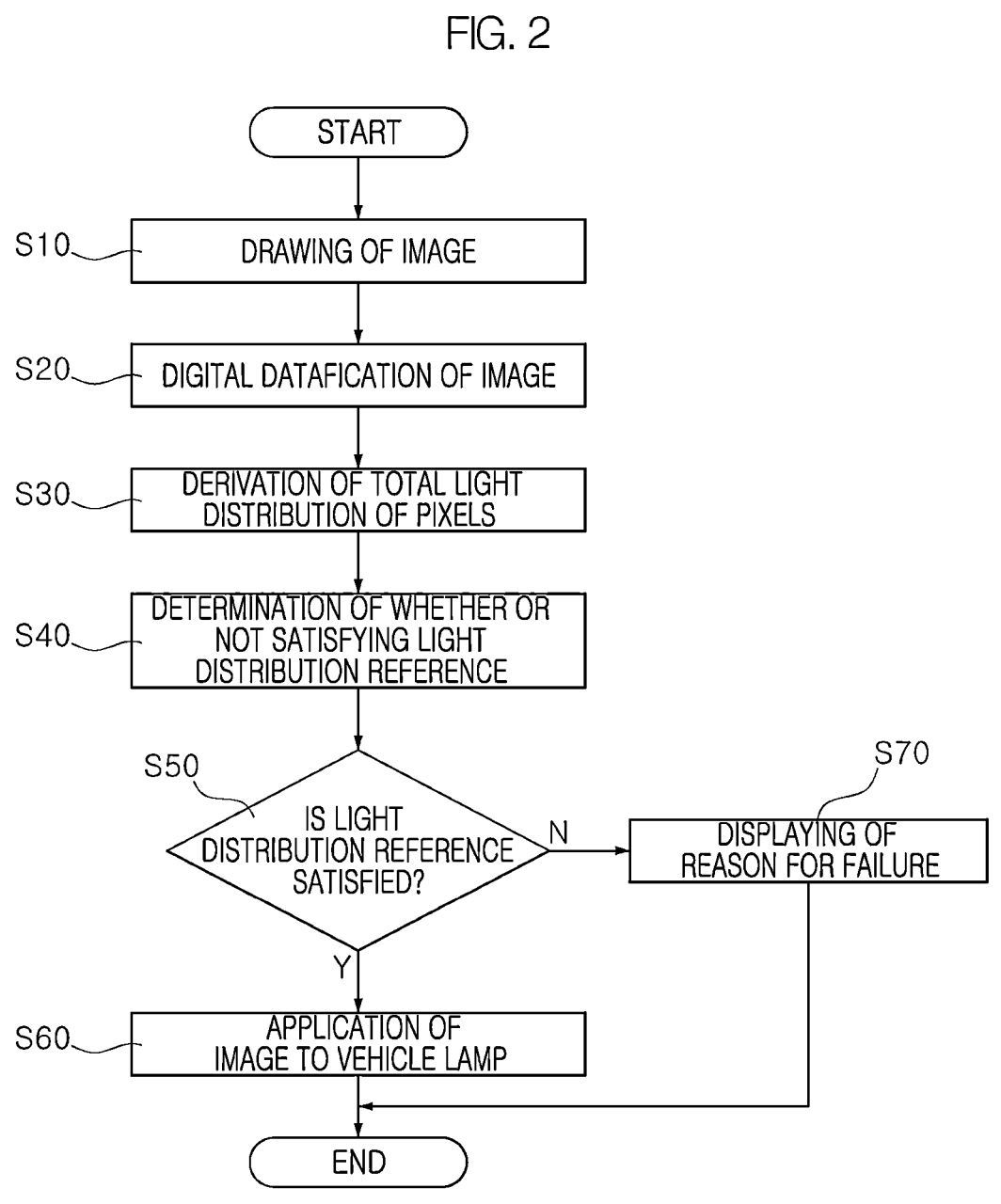
Figure 6:
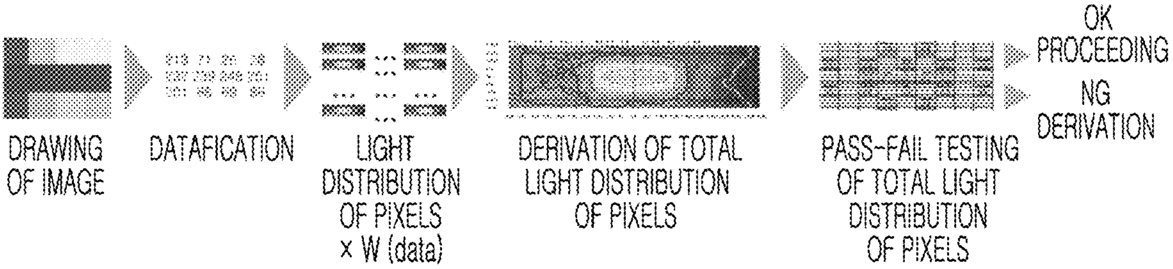
FIG. 6 is a conceptual diagram to illustrate a process of determining whether or not a drawn image obeys light distribution regulations, according to an embodiment of the present disclosure.
Figure 7:
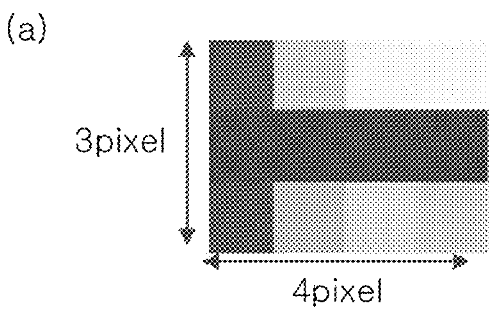
FIGS. 7A and 7B are views each illustrating an example of a drawn image, according to embodiments of the present disclosure.
Figure 7:
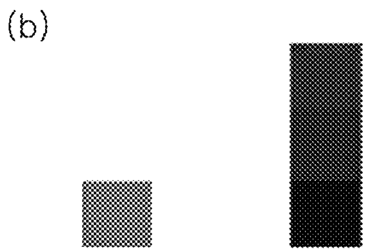
Figure 8:
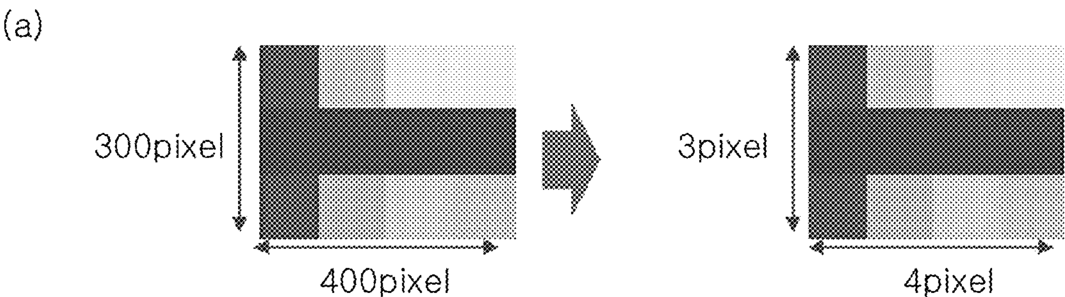
FIGS. 8A and 8B illustrate processes of converting the drawn images illustrated in FIGS. 7A and 7B, according to embodiments of the present disclosure.
Figure 8:
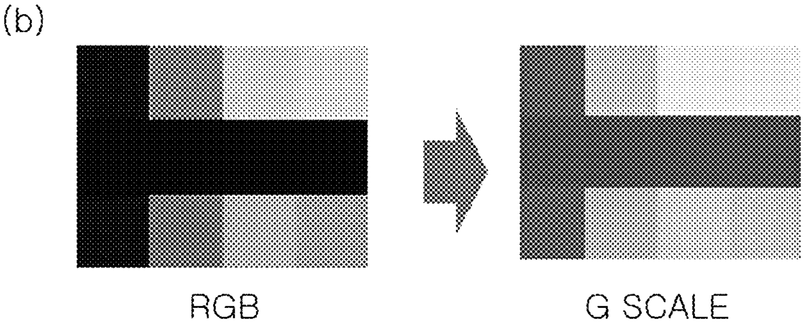
Figure 9:
FIGS. 9A and 9B illustrate conceptual diagrams of a result of digital datafication of the image that results from the conversion in FIGS. 8A and 8B, according to an embodiment of the present disclosure.

FIG. 2 is a flowchart illustrating the method for personalizing a vehicle lamp according to the desired first embodiment of the present disclosure. FIG. 6 is a conceptual diagram that is referred to for description of a process of determining whether or not an image drawn obeys light distribution regulations.

With reference to FIG. 2, in an operation S10, an image made up of the plurality of pixels that constitute the vehicle lamp 10 is drawn based on an input by a user through the input unit 20. The drawn image may be an image that is drawn by the user in a manner that is represented with pixels that constitute the vehicle lamp 10 of a vehicle of the user, for example using an online drawing tool provided by the vehicle manufacturer.

For example, as illustrated in FIGS. 7A and 7B, in an embodiment in which the vehicle lamp 10 is configured with a combination of 3 by 4 pixels, an image that is represented with the combination of 3 by 4 pixels that constitute the vehicle lamp 10 may be input through the input unit 20. As illustrated in FIGS. 7A-7B, the image may be drawn by the user in such a manner that pixels differ in brightness or the like. Thus, various image effect can be added to the image. In addition, for example, in FIGS. 7A and 7B, the pixel is in the form of a square, but the shape of the pixel may be designed in other form, such as a circle, a rectangle, a diamond shape, or an atypical shape throughout the embodiments of the present disclosure as needed.

However, the present disclosure is not limited to such image drawing. For example, when the user draws an image (a primary image) unrelated to the combination of the pixels that constitutes the vehicle lamp 10 and inputs the drawn image through the input unit 20, the data processing unit 30 may process the drawn image (into a secondary image), based on the primary image, in accordance with the combination of the pixels that constitute the vehicle lamp 10.

For example, as illustrated in FIG. 8A, an image drawn and input by the user, in an embodiment in which the image is configured with a combination of 300 by 400 pixels, may be processed into a secondary image configured with a combination of 3 by 4 pixels that is the same as the combination of the 3 by 4 pixels that constitute the vehicle lamp 10, through a processing process of performing simplification using an image warping or the like.

In addition, in an embodiment in which the vehicle lamp 10 is configured to realize only monochrome gray scale, but where the primary image drawn by the user may be a multi-color (e.g., red, green, and blue (RGB)) image, the primary image may be converted into a gray scale secondary image based on a brightness value of each color, as illustrated in FIG. 8B.

In an operation S20, the data processing unit 30 digitally datafies the drawn image and converts a result of the digital datafication into amount-of-color data that correspond to the pixels, respectively, that constitute the vehicle lamp 10. For example, the brightness of each pixel of the drawn image may be divided into a plurality of predetermined levels, and then the drawn image may be converted into a combination of data values that are matched with the levels, respectively.

As illustrated in FIGS. 9A and 9B, in an embodiment, an amount of color of each pixel may be divided into 0 to 255 levels that correspond to 256 colors, respectively, and then the drawn image may be converted into a combination of data that are matched with the levels, respectively. The data values that correspond to the plurality of levels, respectively, may be values that are pre-stored in the data processing unit 30, considering a relationship between a light distribution value that results when a specific pixel is all turned on, and a light distribution value at a specific pixel that results when an amount of color at the specific level is actually realized through the vehicle lamp 10.

In an operation S30, the data processing unit 30 derives total light distribution of the pixels based on the amount-of-color data that result from the conversion in the operation S20 and pre-stored pixel distribution values.

Figure 10:
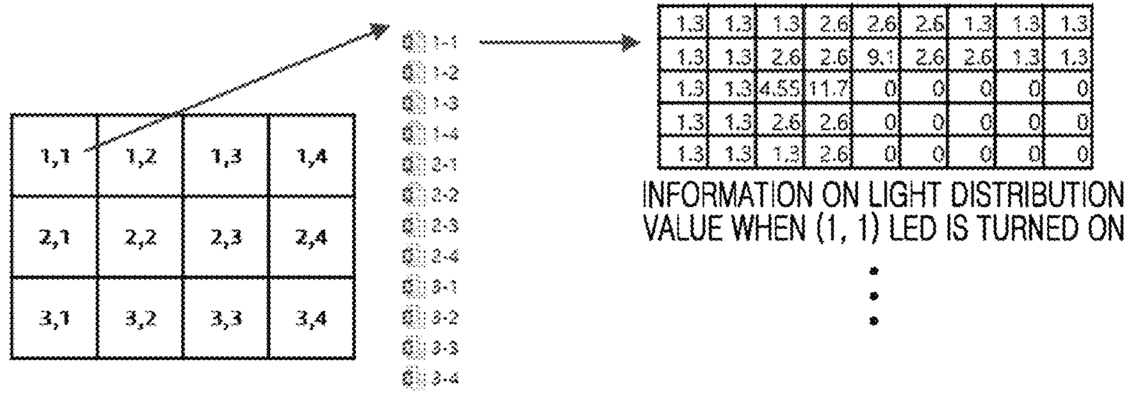
FIG. 10 is a diagram illustrating a light distribution value that is assigned to each of the pixels that constitute the vehicle lamp, according to an embodiment of the present disclosure.

The pre-stored pixel distribution values, as illustrated in FIG. 10, may serve as light distribution values of the vehicle lamp 10 that result when light sources (for example, LEDs) that correspond to the pixels, respectively, that constitute the vehicle lamp 10 are all turned on. In an embodiment, the pixel distribution values are values that are pre-stored in a storage device of the data processing unit 30. Examples of the pre-stored pixel distribution values, as illustrated in FIG. 10, indicate the light distribution values of the vehicle lamp 10 that result when a pixel (1, 1) corresponding to a dot position in the first column and first row on the vehicle lamp 10 is all turned on.

Figure 11:
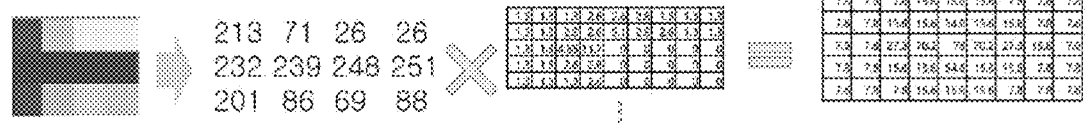
FIG. 11 is a conceptual diagram illustrating a process of computing total light distribution of the pixels using the result of the digital datafication in FIG. 9 and the light distribution value in FIG. 10, according to an embodiment of the present disclosure.

As illustrated in FIG. 11, the data processing unit 30 may multiply the data values, resulting from the conversion in the operation S20, by the pixel light distribution values, respectively, that are pre-stored in association with pixels matched with the data values, and may add up results of the multiplication. Thus, the data processing unit 30 may derive the total light distribution of the pixels that results when the drawn image is realized with the vehicle lamp 10. For example, a data value associated with an amount of color of the pixel (1, 1) that corresponds to a dot position in the first column and first row on the drawn image may be multiplied by a light distribution value that results when the pixel (1, 1) is turned on. In this manner, the same process may be performed on each of the pixels in four columns and three rows. Then, total light distribution of the entire vehicle lamp 10 may be obtained by adding up the results of these multiplications.

In operations S40 and S50, the data processing unit 30 determines whether or not a value of the derived total light distribution of the pixels satisfies a predetermined light distribution reference, by comparing the value of the derived total light distribution of pixels against a predetermined reference value.

Figure 12:
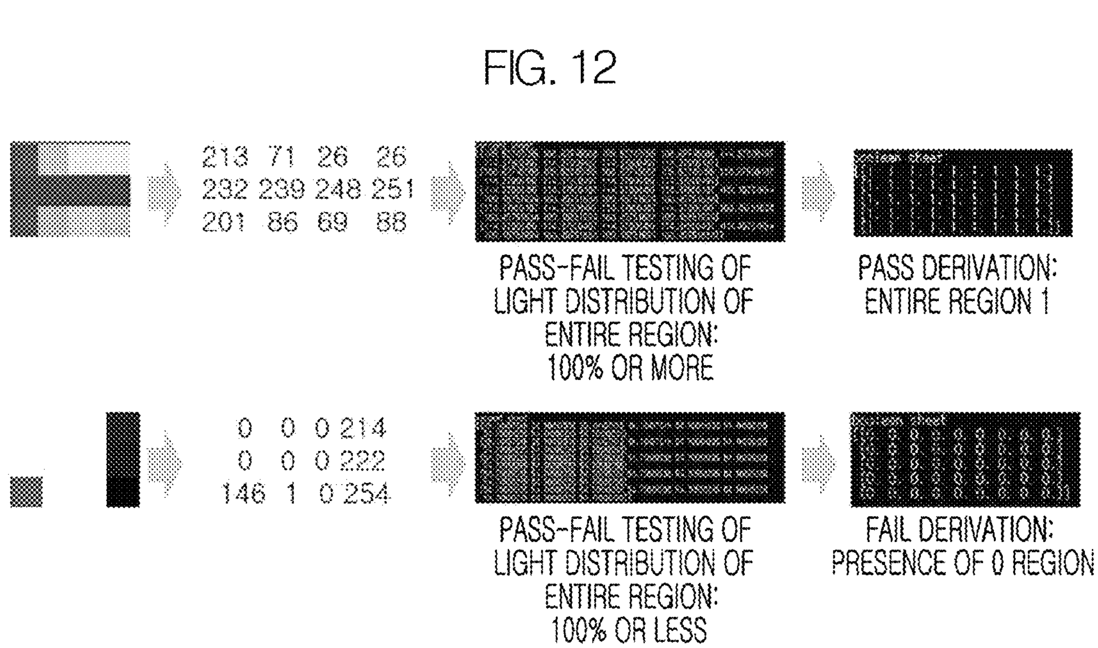
FIG. 12 is a conceptual diagram illustrating a process of performing pass-fail testing of light distribution using the total light distribution of the pixels that is computed in FIG. 11, according to an embodiment of the present disclosure.

As illustrated in FIG. 12, in order to obey the light distribution regulations, all regions of the vehicle lamp 10 have to satisfy a predetermined reference. In a case where even one region does not satisfy the predetermined reference, a failure result may be given. In addition, in a case where a plurality of light distribution regulations applies to the vehicle lamp 10 to which the drawn image is applied, for example, in a case where a plurality of regulations, including a regulation of visible light distribution, a regulation of a light distribution area, a regulation of a distance between the insides of lighting regions, or the like, apply at the same time, only when the plurality of regulations is all obeyed, a pass result may be given. When even one regulation is not obeyed, a failure verdict may be declared.

In a case where it is determined that the drawn image satisfies a predetermined light distribution reference, the data processing unit 30 may transmit a result of the determination and information associated with the drawn image to the controller 40. The controller 40 that receives the result of the determination, and the information may select a group of pixels, to be turned on a per-pixel basis, from among the plurality of pixels that constitute the vehicle lamp 10, in such a manner as to correspond to the information associated with the drawn image received from the data processing unit 30. According to this selection, in an operation S60, the controller 40 may control the vehicle lamp 10 to turn off a specific pixel and to turn on the remaining pixels or adjusts a luminance level or the like of the pixel that is turned on. Thus, the drawn image may be realized in the vehicle lamp 10.

In an operation S70, in a case where it is determined that the drawn image does not satisfy the predetermined light distribution reference, the data processing unit 30 may display a result of the determination and the reason for failure to obey the laws. The user who views the result displayed on the display unit 70 amends the image or redraws an image, and inputs the redrawn image into the input unit 20 (in the operation S10). Thus, the user may again receive a result of the determination by the data processing unit 30 of whether or not the light distribution reference is satisfied.

In an embodiment, based on the result of the determination and the reason for failure to obey the laws, the data processing unit 30 may provide the user with an expert mode in which a guideline for drawing an image that obeys the laws may be provided.

Figure 13:
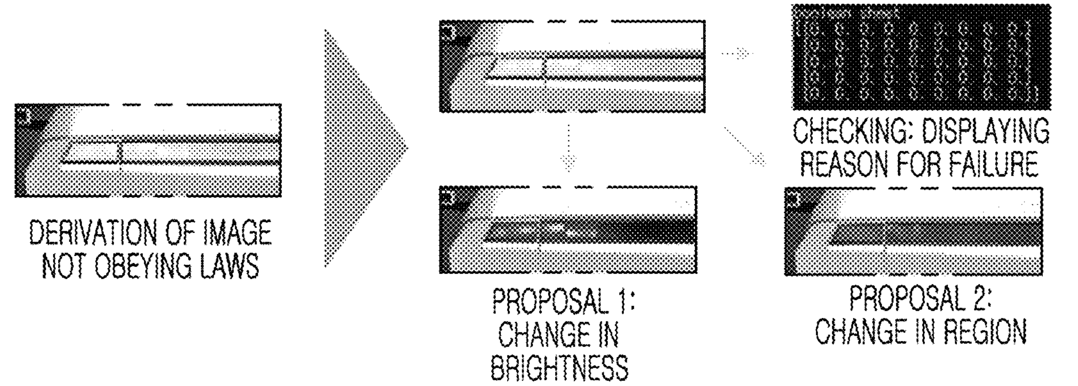
FIG. 13 is a conceptual diagram illustrating an expert mode in which an image modified is proposed to a user in a case where the drawn image fails to obey laws, according to an embodiment of the present disclosure.

For example, as illustrated in FIG. 13, in a case where it is determined in the operation S40 that a specific region of the vehicle lamp 10 does not satisfy a reference for an amount of light that is specified in the laws for light distribution, the data processing unit 30 may provide, via the display unit 70, a proposal to increase the brightness of the specific region.

As another example, in a case where the result of the determination in the operation S40 may be that the vehicle lamp 10 falls short of a predetermined light emission area specified on the laws, the data processing unit 30 may provide, via the display unit 70, a proposal for an image change to enlarge a light emission region to a light emission region corresponding to the predetermined light emission area. In addition, the data processing unit 30 may propose a guideline for the image change and may display a similarity image to which the guideline applies, as a reference, on the display unit 70.

In some cases, an ordinary user does not know various laws that apply to the vehicle lamp 10. In some cases, although the user may know the various laws, the user may not know how the image may be changed to obey the various laws. Therefore, in a case where the expert mode is provided and thus where the guideline for the image change to obey the laws may be displayed on the display unit 70, the user may be allowed to easily change the image to obey the various laws. Thus, accessibility to personalized illumination by the ordinary user may be increased.

Figure 15:
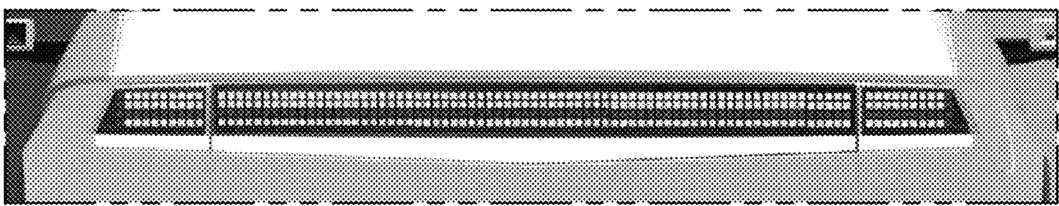
FIG. 15 is a view illustrating an example where the drawn image is applied to a lamp of an actual vehicle, according to an embodiment of the present disclosure.

FIG. 15 illustrates an example of the vehicle lamp 10 that is realized through this process, according to an embodiment. The vehicle lamp 10 illustrated in FIG. 15 serves as a brake lamp that is arranged in the rear of a vehicle. When a driver operates a brake, the brake lamp may emit light in a shape that corresponds to a specific drawn image. However, the present disclosure is not limited to the example illustrated in FIG. 15. The illumination personalization technology described herein may be applied to a head lamp, a daytime running lamp, or the like that is mounted in the front of the vehicle.

Figure 3:
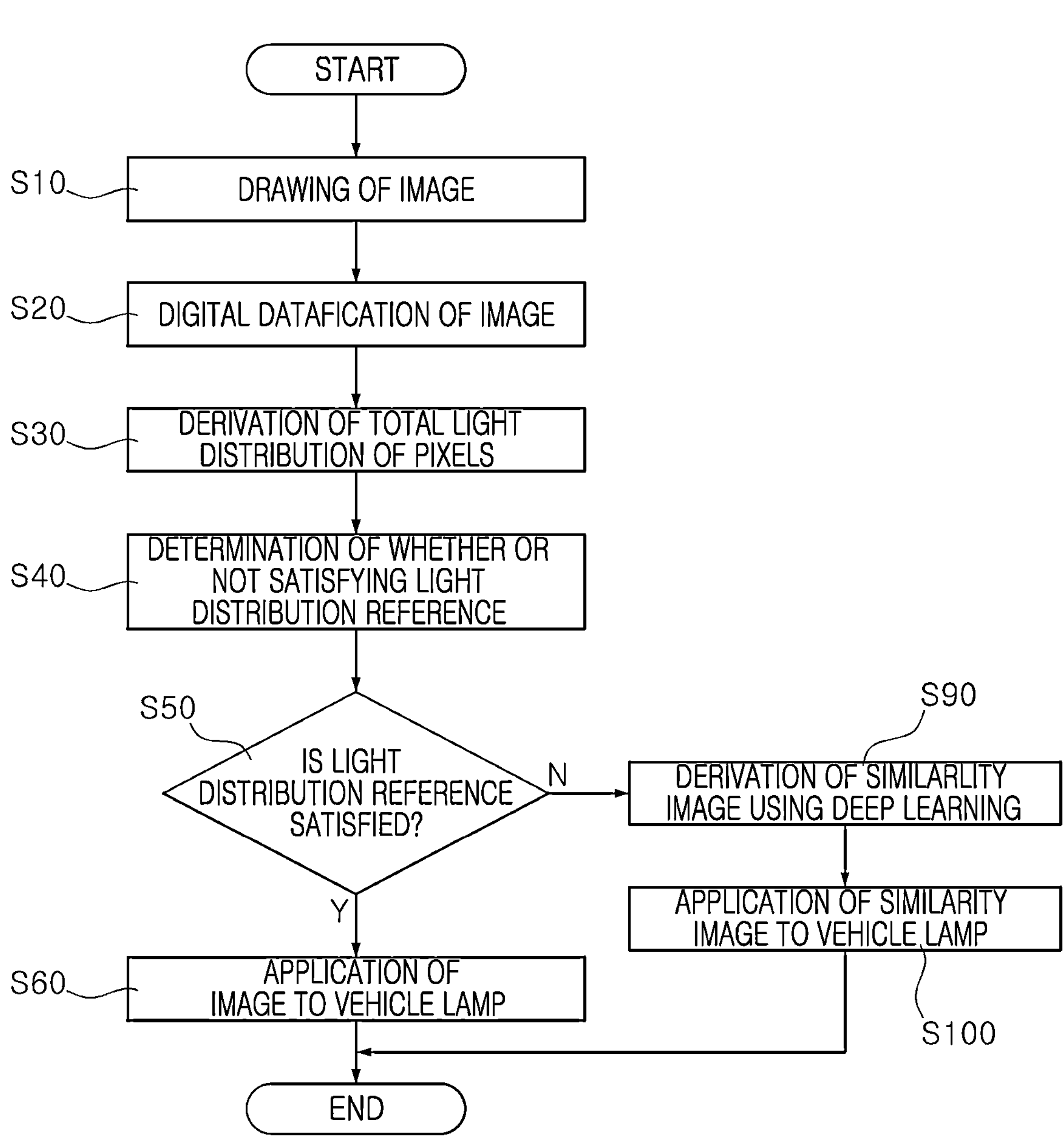
FIG. 3 is a flowchart illustrating a method for personalizing a vehicle lamp according to another embodiment of the present disclosure.

FIG. 3 is a flowchart illustrating the method for personalizing a vehicle lamp according to an embodiment of the present disclosure. The method for personalizing a vehicle lamp illustrated in FIG. 3 is generally the same as the method for personalizing a vehicle lamp illustrated in FIG. 2, except that different processing operations (general modes) are performed (e.g., entered) when the drawn image does not satisfy the light distribution reference in the operation S50. Therefore, operations of the method for personalizing a vehicle lamp illustrated in FIG. 3 that are the same as that of the method for personalizing a vehicle lamp that is described with reference to FIG. 2 are not described in detail below.

Referring to FIG. 3, in a case where the drawn image does not satisfy the light distribution reference in the operation S50, the data processing unit 30 may generate a similarity image that not only obeys the laws for light distribution, but is also similar to the drawn image, for example by performing deep learning, in an operation S90.

Figure 14:
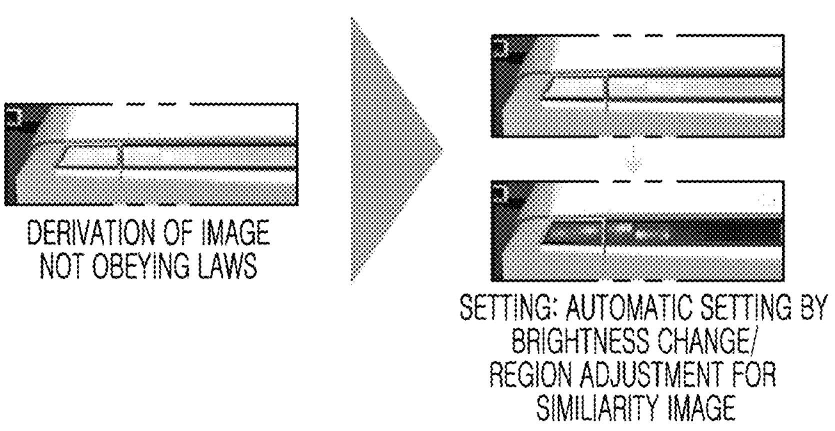
FIG. 14 is a conceptual diagram illustrating a general mode in which the drawn image is automatically modified in such a manner as to obey the laws in the case where the drawn image fails to obey the laws, according to an embodiment of the present disclosure.

For example, as illustrated in FIG. 14, in a case where the result of the determination in the operation S40 may be that a specific region of the vehicle lamp 10 does not satisfy the reference for the amount of light specified in the laws for light distribution or falls short of the light emission area, the data processing unit 30 may increase the brightness of the specific region or may generate a similarity image that results from partly enlarging the light emission region, for example by performing the deep learning.

The data processing unit 30 may transmit information associated with the similarity image to the control unit 40 so that the similarity image generated in the operation S90 may be applied to the vehicle lamp 10. As in the operation S60, the controller 40 may control the vehicle lamp 10 to turn off a specific pixel and turn on the remaining pixels or adjusts a luminance level or the like of the pixel that is turned on. Thus, the similarity image may be realized in the vehicle lamp 10 (in an operation S100).

In an embodiment, as described in more detail below, in a case where the similarity image is derived in the operation S90, before the derived similarity image is applied to the vehicle lamp 10 in the operation S100, the data processing unit 30 may cause the display unit 70 to display the reason for failure to obey the laws and the similarity image. Thus, the user may input whether or not the derived similarity image is applied to the vehicle lamp 10.

Figure 4:
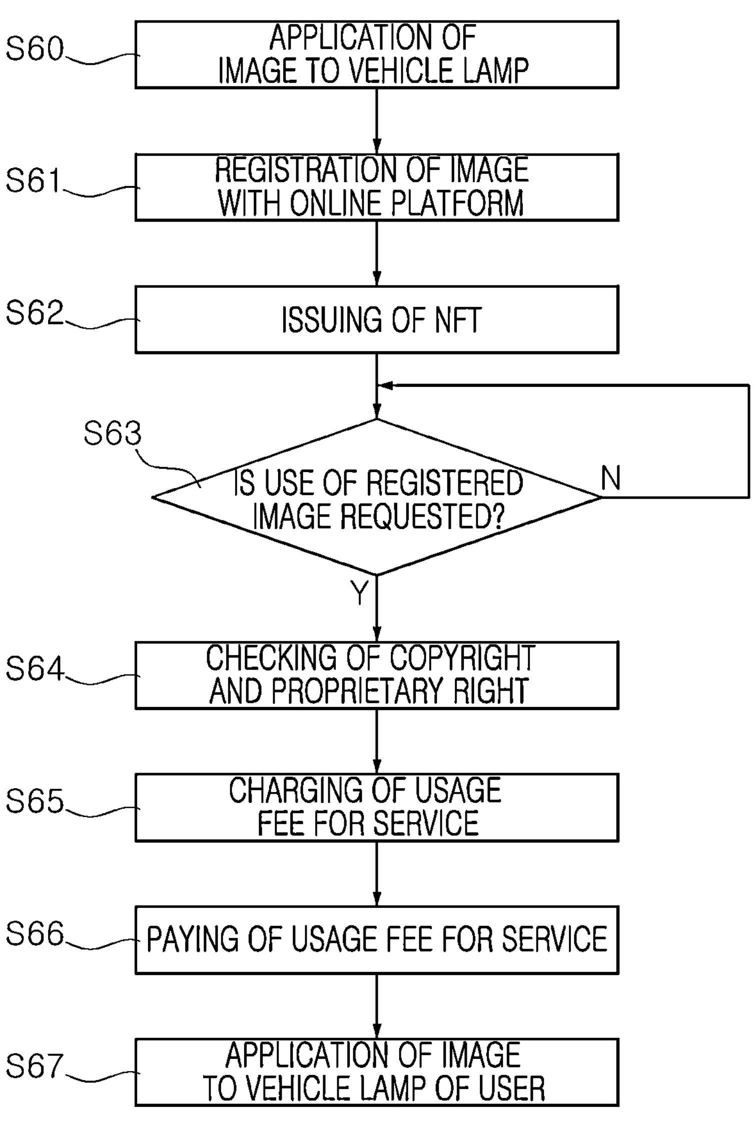
FIG. 4 is a flowchart illustrating a process of issuing a non-fungible token (NFT) using an image in a case where the image satisfies the light distribution reference in FIG. 2, according to an embodiment of the present disclosure.

FIG. 4 is a flowchart of a process of issuing a non-fungible token (NFT) using an image in a case where an image satisfies the light distribution reference in FIG. 2, according to an embodiment.

In a case where the data processing unit 30 determines that the drawn image satisfies the light distribution reference, as described above, the data processing unit 30 may provide the result of the determination and the information associated with the drawn image to the controller 40 so that the drawn image is applied to the vehicle lamp 10 in the operation S60.

In a case where it is determined that the drawn image is an image that is initially applied to the vehicle and obeys the laws, the user may upload the drawn image to the online platform and thus issues the NFT. In this manner, a revenue model that uses the drawn image may be created. The creation of the revenue model, according to an embodiment, is described in more detail below with reference to FIG. 4.

In an operation S61, the image, determined as satisfying the laws, may be registered by the user with the server for the online platform 60. The online platform 60 may be created on a blockchain-based network and may provide a service associated with the use of an image to the user who purchases the vehicle.

In an operation S62, the server for the online platform 60 that uses a blockchain-based NFT may issue an NFT that is a blockchain-based token that provides a proprietary right, and a copyright, to the image registered with the online platform 60.

The NFT may thus be issued to an account for the online platform 60 through which a proprietary right to the user's vehicle is identified. In this manner, only the owner of the vehicle may be allowed to register an NFT for an image created by the user, through the online platform 60. Thus, the desire to own the vehicle may be enhanced.

The server for the online platform 60 may register information on the image with the online platform and may provide support to at least one user who makes a connection to the blockchain-based network on which the online platform 60 is created, in such a manner that the user can use a service associated with the image.

In an operation S63, a request may be made by at least one user, among a plurality of users that connect to the network on which the online platform 60 is created, to the server for the online platform 60 to use a service associated with an image provided by the online platform 60. For example, the user may make connect to the online platform 60 through a terminal of the user's own device and may make a request to the online platform 60 to download an image among a plurality of pre-registered images.

In a case where it is determined that the user makes this request (YES in an operation S63), the server for the online platform 60 may identify a blockchain-based NET that is pre-issued to an image for which the request is received in the operation S62. In an operation S64, the server for the online platform 60 may check copyright information and proprietary right information of the image based on the identified blockchain-based NFT for the image.

The checked proprietary right information of the image may be compared against account information of the user who makes a request to use the service. In a case where they are different, the server for the online platform 60 may determine a method for paying a usage fee for a service associated with the image re-registered by a creator who creates the image based on the checked copyright information and proprietary right information. In an operation S65, the server for the online platform 60 may charge the usage fee for the service associated with the image to the terminal for service use based on the determined method for paying the usage fee.

In a case where the copyright information and the proprietary right information that are matched with the image requested in the operation S64 are consistent with information of the user who makes the request, that is, in a case where the user who makes the request for the service use may be the creator of the image, the image may be immediately applied to the vehicle lamp 10 without separately charging the usage fee for the service.

In a case where the server for the online platform 60 determines that the usage fee for the service is paid by the terminal for service use in an operation S66, the server for the online platform 60 may provide the service associated with the image to the terminal for service use. Instead of the provided image, in an operation S67, the drawn image may be applied to the vehicle lamp 10 using the above-described method according to the embodiment illustrated in FIG. 2.

In an embodiment, based the copyright information and proprietary right information that are checked in the operation S64, the server for the online platform 60 may provide payment of a service charge associated with the use of the image to the creator who creates the image, with reference to a predetermined method for paying the usage fee and the charged usage fee.

Figure 5:
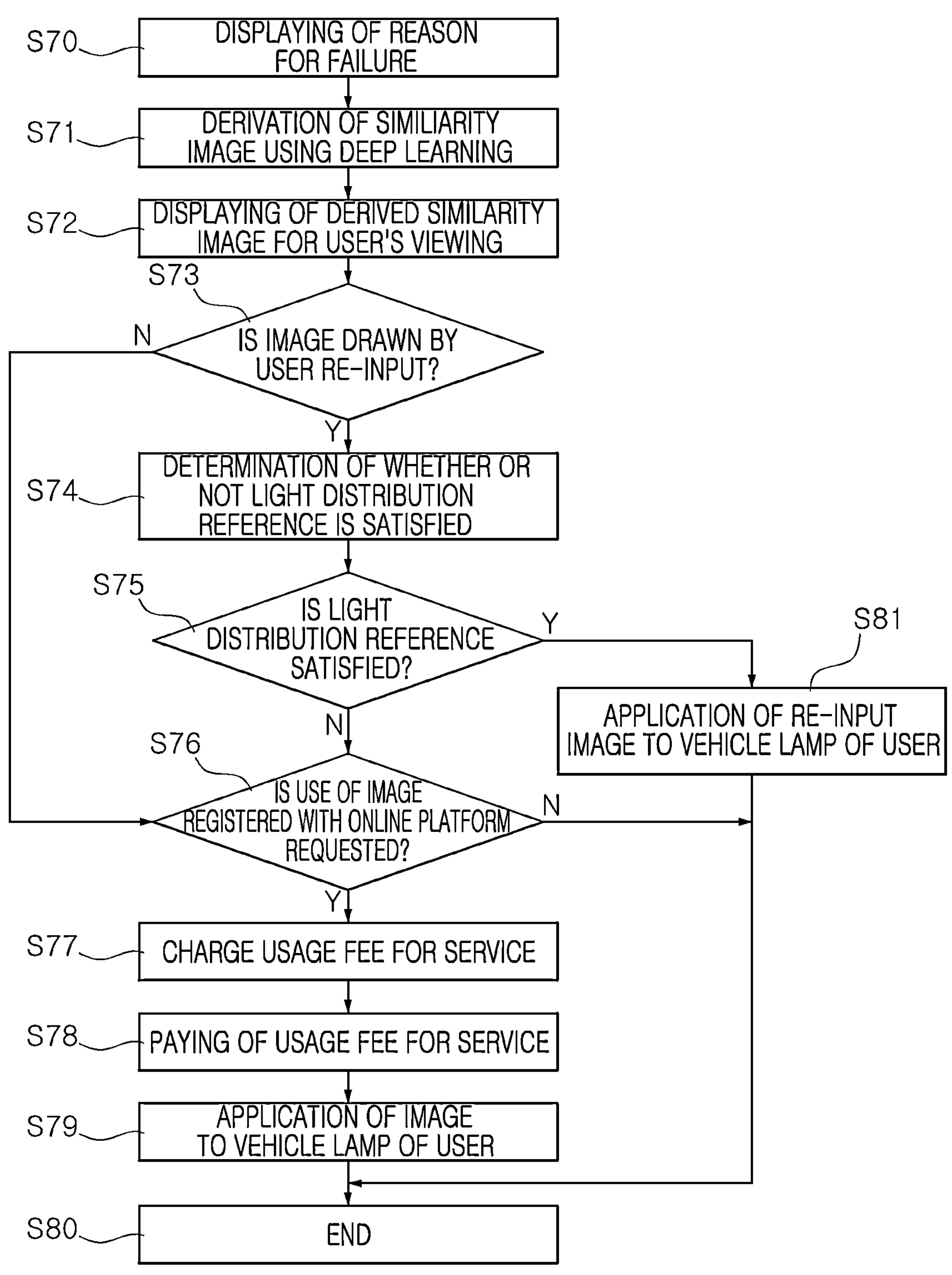
FIG. 5 is a flowchart illustrating a process of utilizing an image registered with an existing platform in a case where the image does not satisfy the light distribution reference in FIG. 3, according to an embodiment of the present disclosure.

FIG. 5 is a flowchart illustrating a process for utilizing an image registered with an existing platform in a case where the image does not satisfy the light distribution reference in FIG. 3, according to an embodiment. Operations that are the same as those of the methods of personalizing a vehicle lamp according to the embodiments of the present disclosure described above with reference to FIGS. 2, 3, and 4, are not described in detail below.

As described above, in a case where the data processing unit 30 determines that the drawn image input through the input unit 20 does not obey the laws, the data processing unit 30 may, in an operation S70, cause the display unit 70 to display the reason for failure to obey the laws.

In an operation S71, the data processing unit 30 may derive a similarity image that may be similar to the image drawn by the user and may obey the laws, by performing the deep learning. In an operation S72, the data processing unit 30 may cause the display unit 70 to display the derived similarly image.

The user may re-input a newly drawn image with reference to the similarity image displayed on the display unit 70 or may re-input the similarity image as is. When it is determined that the drawn image is re-input by the user (YES in an operation S73), by performing the above-described process, the data processing unit 30 may determine whether or not the re-input image satisfies the light distribution reference in operations S75 and S74.

In a case where it is determined that the re-input image satisfies the light distribution reference, by performing the above-described process, in an operation S81, the data processing unit 30 causes the controller 40 to apply the re-input image to the vehicle lamp 10 of the user.

In a case where it is determined that the re-input image does not obey the laws, such as the light distribution reference, the user may abandon the use of the image drawn by him/her and may use an image drawn by another person that is registered with the server for the online platform 60.

Therefore, in a case where a request is made to use an image registered with the online platform 60 in an operation S76, by performing the above-described process, the server for the online platform 60 may charge a usage fee for the service to the user who makes the request to use the image in an operation S77. When it is checked that the usage fee for the service is paid in an operation S78, the server for the online platform 60 may provide the service associated with the image to the terminal for service use. Instead of the provided image, in an operation S79, the drawn image may be applied by the user to the vehicle lamp 10 using the above-described method according to the embodiment illustrated in FIG. 2.

Among laws associated with the vehicle lamp 10, there is a law for limiting color intensity realized by the vehicle lamp 10 to a predetermined range.

Therefore, in order to determine whether or not an image obeys the law associated with the color intensity, in the method for personalizing a vehicle lamp according to embodiments described above, in digital datafication of the drawn image, the drawn image may be converted into RGB data instead of being converting into amount-of-color data that correspond to pixels, respectively. In the method for personalizing a vehicle lamp according to embodiments described above, in determining whether or not the image satisfies references specified in the laws associated with the vehicle lamp 10, it may be determined whether or not a ratio between each of the colors that constitute the RGB data satisfies a predetermined color intensity reference.

For example, in a case where a color of the drawn image is realized through the vehicle lamp 10, and in a case where, when a RED value is 100 based on a RGB value of the realized color, a BLUE value is 10 or greater, it may be determined that this violates regulations specified in laws for the color intensity.

A method for personalizing a vehicle lamp according to another embodiment of the present disclosure, which may be performed by the data processing unit 30, is described in detail below with reference to FIGS. 16 to 20. Operations that are the same as those of the method for personalizing a vehicle lamp according to the embodiments described above with reference to FIGS. 1 to 15 are not described in detail below.

Among the laws associated with the vehicle lamp 10, there are laws stipulating conditions for installing the vehicle lamps 10, such as a distance between a lighting region and the outermost edge of the vehicle, a distance between the insides of lighting regions of a plurality of lamps, and the maximum ground clearance and the minimum ground clearance of the lighting region.

The method for personalizing a vehicle lamp according to the embodiment illustrated in FIGS. 16 to 20 may determine whether or not regulations specified in laws for the conditions for installing the vehicle lamp 10 are obeyed.

Figure 16:
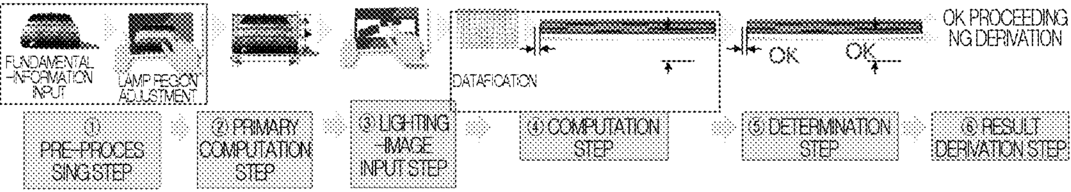
FIG. 16 is a flowchart illustrating a method for personalizing a vehicle lamp according to another embodiment of the present disclosure.

As illustrated in FIG. 16, pre-processing operations may be performed. In the pre-processing operations, fundamental information, such as a vehicle image, a lamp region, a vehicle full-width, a vehicle full-height, the number of the pixels that constitute the vehicle lamp 10, and a pixel size may be input from the input unit 20 and the lamp region may be set in the vehicle.

Figure 17:
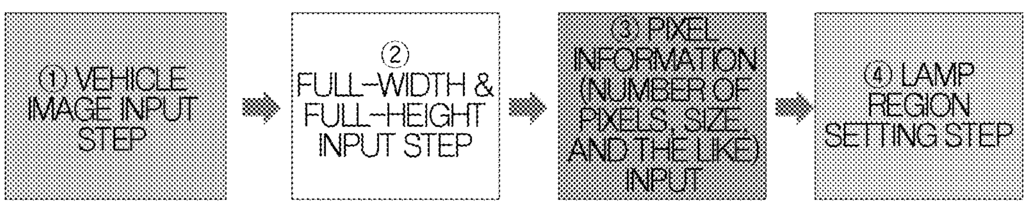
FIG. 17 is a flowchart illustrating pre-processing operations in FIG. 16, according to an embodiment of the present disclosure.
Figure 18:
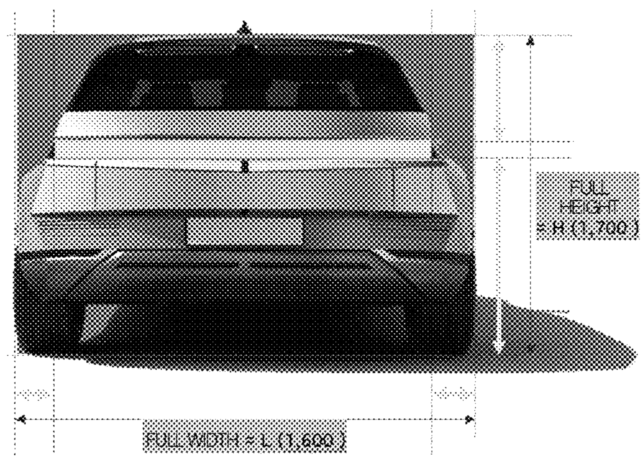
FIG. 18 is a view illustrating a vehicle image and data that are input in the pre-processing operations in FIG. 16, according to an embodiment of the present disclosure.

With reference to FIG. 17, in the pre-processing operations, the vehicle image, such as the image illustrated in FIG. 18, may be input into the input unit 20.

As illustrated in FIG. 18, the vehicle image may be an image of a front or rear surface of the vehicle on which a front surface of the vehicle lamp 10 may appear and may be an image through which the conditions (the minimum ground clearance, the maximum ground clearance, a distance to the outermost edge of the vehicle, or the like) for installing the vehicle lamp 10 may be visually checked.

In an embodiment, inputting the vehicle image may be omitted when exact data on the vehicle full-width, the vehicle full-height, and the lighting region of the vehicle lamp 10 inside the vehicle body are input within an acceptable fault tolerance through an operation in which the vehicle full-width and the vehicle full-height are provided and an operation in which pixel information is provided, as described in more detail below.

In an embodiment, as in the example illustrated in FIG. 18, information associated with dimensions of the vehicle, such as the vehicle full-width and the vehicle full-height, may be input through the input unit 20. In addition to, or instead of, data being inputted through the input unit 20, data on the dimensions may be retrieved from a storage device provided inside the vehicle by the vehicle manufacturer.

In an embodiment, in a case where the vehicle lamp 10 is configured with a plurality of pixels, data such as the number of pixels and a size of each of the pixels may be provided (e.g., input through the input unit 20).

In an operation of setting the lamp region, the lamp region recognized from the vehicle image that is input may be modified using data that is input in association with the dimensions of the vehicle and the vehicle lamp 10. Thus, a lighting-capable region of the vehicle lamp 10 inside the vehicle body may be set.

Figure 19:
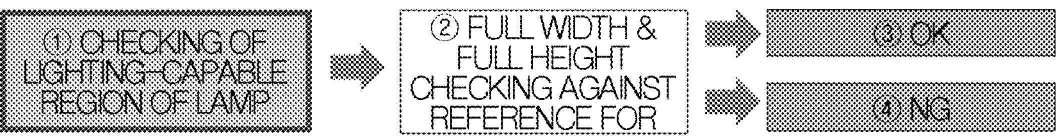
FIG. 19 is a flowchart illustrating an operation of checking installation of a lighting-capable region based on input information that is illustrated in FIG. 18, according to an embodiment of the present disclosure.

As illustrated in FIG. 19, when the lighting-capable region of the vehicle lamp 10 inside the vehicle body is checked, the vehicle full-height, the vehicle full-width, or the like may be compared against numerical values specified in laws for installing a vehicle lamp. The vehicle full-width, the vehicle full-height, the abilities of the number of pixels, and the size of a pixel to be matched may be checked.

Figures 20, 21, 22:
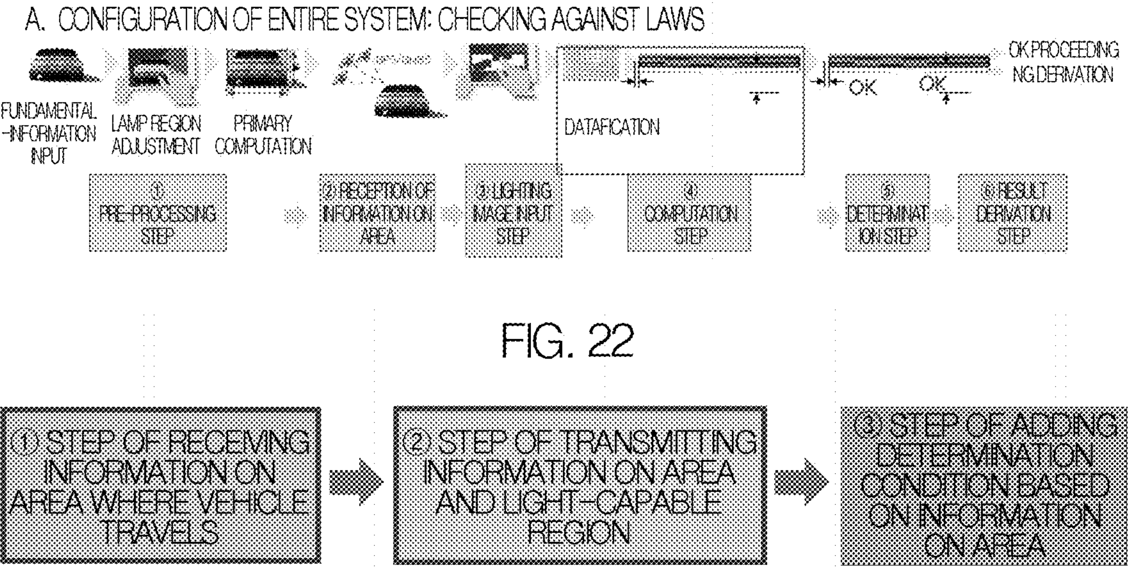
FIG. 20 is a view illustrating installation information that is checked in the operation illustrated in FIG. 19, according to an embodiment of the present disclosure.
FIG. 21 is a flowchart illustrating a set of operations for checking whether or not references specified in laws associated with installation are satisfied, in a method for personalizing a vehicle lamp according to an embodiment of the present disclosure.
FIG. 22 is a flowchart illustrating a set of operations for receiving information on an area in the flowchart illustrated in FIG. 21, according to an embodiment of the present disclosure.

For example, as illustrated in FIG. 20, the minimum ground clearance, the maximum ground clearance, and the distance to the outermost edge of the lighting-capable region of the lamp may be checked. In addition, in a case where the vehicle lamp 10 is configured with a plurality of lamps, the distance between the insides of the plurality of lamps may be checked. Numerical values that result from the checking may be used to determine whether or not the laws for installing a vehicle lamp are obeyed, when personalizing the vehicle lamp 10.

In a case where numerical values for installation that result from checking are consistent with reference numerical values for the installation of the vehicle lamp 10 that are defined by the vehicle manufacturer, pre-processing may be ended. On the other hand, in a case where the numerical values that results from the checking are not consistent with the reference numerical values for the installation of the vehicle lamp 10 that are defined by the vehicle manufacturer, re-computation may be performed using input data that are input in association with a light emission surface.

A lighting image drawn by the user may then be input through the input unit 20. The above-described process may be the same as the process of the method for personalizing a vehicle lamp described above with reference to FIGS. 1 to 15, and thus a detailed description thereof is not provided below.

In an embodiment, the drawn image may be digitally datafied, and the height of the lighting region (the light emission surface) with respect to the ground, the distance to the outermost edge of the lighting region, or the like, may be computed based on results of the digital datafication.

Depending on the drawn image, only some pixels may be turned on, and the other pixels may be turned off in the vehicle lamp 10 that is configured with a plurality of pixels. Therefore, maximum and minimum heights of the turned-on pixel with respect to the ground, and a distance to the outermost edge of the turned-on pixel may be computed based on information on the lighting-capable region of the lamp and positional information of the turned-on pixel, which may be determined in pre-processing. For example, in a case where, based on the drawn image, pixels are turned on starting from the third pixel from the outermost pixel on the right side, a value that results from subtracting a length of the turned-off two pixels from the distance to the outermost edge that is determined in pre-processing corresponds to a distance to the outermost edge on the right side of the personalized lamp.

Next, whether or not the laws for installing a vehicle lamp are obeyed may be determined based on a result of the computation. In a case where it is determined that the laws for installing a vehicle lamp are obeyed, the drawn image may be applied to the vehicle lamp 10 for use. On the other hand, in a case where it is determined that the laws for installing a vehicle lamp are not obeyed, the reason for failure to obey the laws may be displayed, and a similarity image that may obey the laws may be proposed by performing deep learning. Processing operations that are performed when the laws are obeyed and when the laws may be not obeyed are the same as those of the method for personalizing a vehicle lamp according to embodiments described with reference to FIGS. 1 to 15, and thus a detailed description thereof is not provided below.

The laws associated with the vehicle lamp 10 may vary among countries. For example, the Korean outdoor advertisement law prohibits display of characters through the vehicle lamp 10. However, the regulations associated with the vehicle lamp 10 in Europe do not restrict a shape of a lamp, and thus it is possible to display characters through the vehicle lamp 10. In the USA, in some cases, regulations associated with a fog light, a signal light, or the like, vary among states. Therefore, regulations specified in laws that apply to the vehicle lamp 10 of a vehicle may vary according to a country in which the vehicle travels.

Therefore, in the method for personalizing a vehicle lamp according to embodiments of the present disclosure described with reference to FIGS. 21 and 22, information on an area in which the vehicle currently travels is received. Then, information on laws associated with regulations applying in the area in which the vehicle travels is used to determine whether or not an image of the personalized lamp obeys the laws.

For example, as illustrated in FIG. 22, a GPS receiver installed in the vehicle may receive positional information of the area in which the vehicle currently travels, from a global positioning system (GPS) that is one of global navigation satellite systems (GNSS). Lighting information (laws) associated with the vehicle lamp 10, which is necessary in the area in which the vehicle travels, may be obtained (e.g., received) based on the received positional information of the area. The information on the laws may be stored in a storage device that is pre-installed in the vehicle in a manner that is matched with a specific area.

Alternatively, the information on the laws that is matched with the specific area may be received by connecting to a server or the like of the vehicle manufacturer through the communication module 50, such as a modem, that is installed in the vehicle. In this case, even when the laws associated with the vehicle lamp 10 that apply in the area, are amended, recent information on the laws may be applied as an update.

Based on the amended positional information of the vehicle and the amended lighting information (laws), the controller 40 may add or amend a determination reference that is used to determine whether or not the laws are obeyed through the above-described methods of personalizing a vehicle lamp according to embodiments of the present disclosure.

For example, use of the drawn image may be limited in a case where the lighting region of the vehicle lamp 10 that is based on the drawn image obeys laws applying in an area in which the vehicle is manufactured and sold, but does not obey laws applying in an area in which the vehicle currently travels. The drawn image may be applied to the vehicle lamp 10 for use in a case where the lighting region of the vehicle lamp 10 that is based on the drawn image obeys the laws applying in the area.

Among the laws associated with the vehicle lamp 10, there is a law that, for the reason of design and structure, permits a single lamp to emit light in a manner that divides the same function, but requires a distance between light emission surfaces resulting from division to be a predetermined distance or shorter (for example, 75 mm or less). Moreover, in each country, there is a law that requires a total lighting area, resulting from adding up a plurality of light emission surfaces, to satisfy a requirement for a minimum area on a per-function basis.

A method for determining whether or not laws associated with a distance between the above-described light emission surfaces and an area of the light emission surfaces are obeyed when some pixels are separated and are turned on in such a manner that the drawn image is applied to the vehicle lamp 10 that is configured with a plurality of pixels, according to an embodiment, is described below with reference to FIGS. 23 to 35K.

Figures 23, 24, 25, 26:
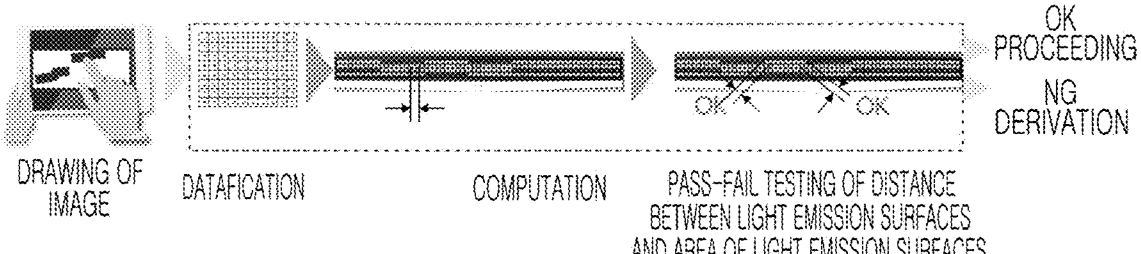
FIG. 23 is a flowchart illustrating a method for personalizing a vehicle lamp according to an embodiment of the present disclosure.
FIG. 24 is a view illustrating an example of a structure where the pixels that constitute the vehicle lamp are arranged, according to an embodiment of the present disclosure.
FIG. 25 is a view illustrating a method for setting a checking-reference pixel region with one turned-on pixel on the center thereof, according to an embodiment of the present disclosure.
FIG. 26 is a view illustrating the checking-reference pixel region with a turned-on pixel of a different size on the center thereof, according to an embodiment of the present disclosure.

The lighting region of the lamp that is illustrated to help describe an embodiment of the present disclosure is as illustrated in FIG. 24. As illustrated in FIG. 24, an example vehicle lamp may be configured with 275 pixels and the pixels may have the same width and length of 15 mm.

As illustrated in FIG. 24, a unique pixel number may be assigned to each pixel on a per-position basis. The first pixel may be a pixel positioned on an upper right end portion of the lamp, and the 275-th pixel may be a pixel positioned on a lower left end portion of the lamp. A pixel that is shaded in FIG. 24 indicates a pixel that is turned on, and a pixel that is not shaded indicates a pixel that is turned off. The structure of the vehicle lamp illustrated in FIG. 24 is only an example, and the number of pixels and the size of the pixels may vary according to a function and size of the vehicle lamp that is used, for example.

Figure 27:
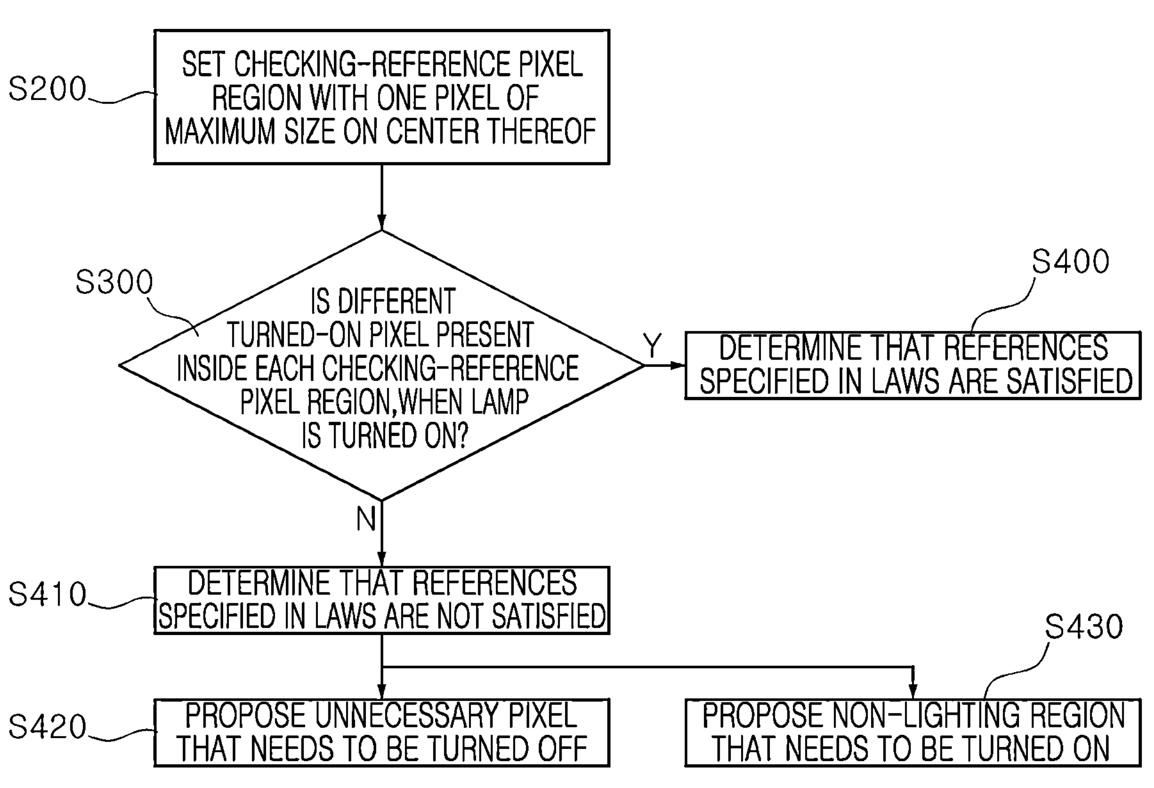
FIG. 27 is a flowchart illustrating a set of operations for checking whether or not references in laws associated with a distance between light emission surfaces are satisfied, in a method for personalizing a vehicle lamp according to an embodiment of the present disclosure.

In an embodiment of the present disclosure illustrated in a flowchart in FIG. 27, in an operation S200, a checking-reference pixel region of a predetermined size may be set with each of the pixels, constituting the vehicle lamp, on the center thereof. In an operation S300, it is determined whether or not a different turned-on pixel is present inside the checking-reference pixel region of the turned-on pixels, and based on a result of the determination, it is determined whether or not the references specified in the laws are satisfied.

As described above, in a case where it is stipulated that a minimum distance between the light emission surfaces is 75 mm or less, as illustrated in FIG. 25, a region, having a distance of 75 mm or less from the outermost boundary of the turned-on pixel that serves as the center thereof, may be set to be the checking-reference pixel region. In the example illustrated in FIG. 24, the maximum width and length of one pixel are 15 mm. Therefore, the checking-reference pixel region may be set to be a pixel region that corresponds to 5 pixels (75 mm) or less from the outermost boundary of the turned-on pixel. In the example illustrated in FIG. 24, as in the checking-reference pixel region illustrated in the left side of FIG. 26, pixels have the same size. However, as in the checking-reference pixel region illustrated in the right side of FIG. 26, there may be a case where some pixels vary in size. In this case, as illustrated in FIG. 26, the checking-reference pixel region in a different shape may be set around the outermost boundary of such pixels.

When in all turned-on pixels, the checking-reference pixel region has a turned-on pixel in common with a different checking-reference pixel region, in an operation S400, it may be determined that the laws associated with the distance between the light emission surfaces are obeyed. In contrast, when it is determined that the checking-reference pixel region with a specific turned-on pixel on the center thereof does not have a turned-on pixel in common with a different checking-reference pixel region, in an operations S410, it may be determined that the laws for the distance between the light emission surfaces are not obeyed.

In a case where it is determined that the references specified in the laws are not satisfied, the controller 40 may propose to the user a similarity image that may obey the laws.

Figure 29A:
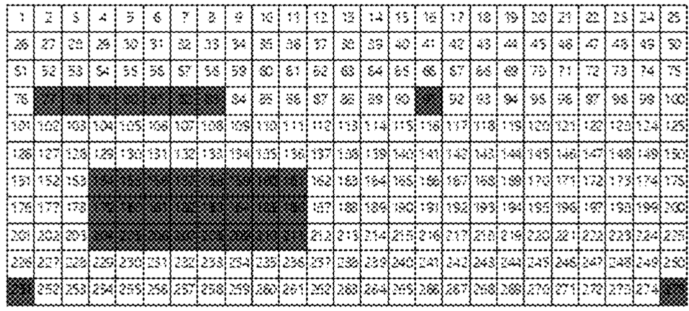
FIGS. 29A to 29C are views to illustrate detailed description of the first method illustrated in FIG. 28, according to embodiments of the present disclosure.
Figure 29B:
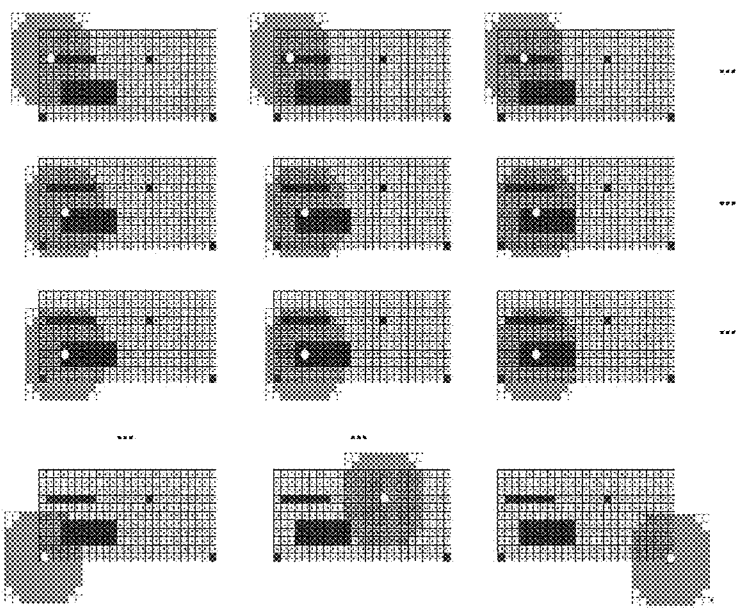
Figure 29C:
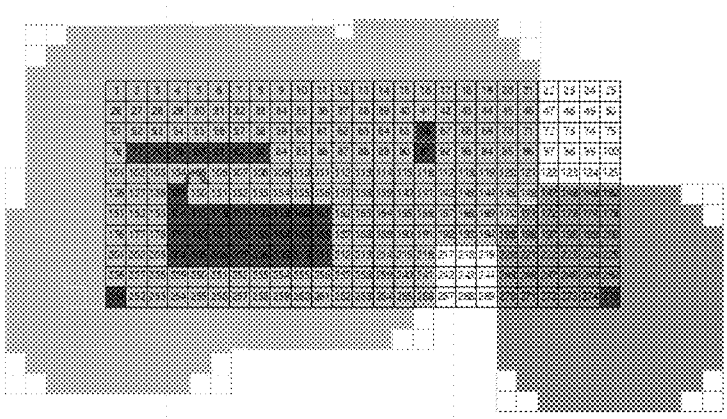
Figure 29D:
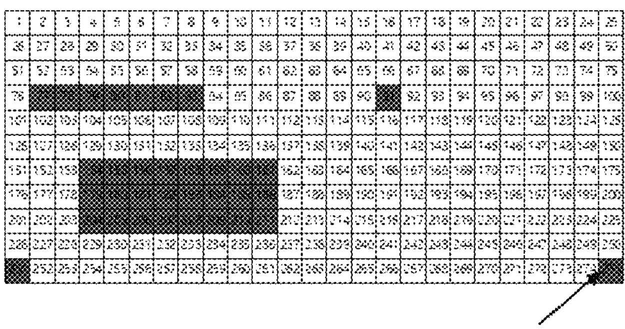
FIG. 29D to 29F are views illustrating a proposal that may satisfy references specified in laws when the references are not satisfied, according to embodiments of the present disclosure.
Figure 29E:
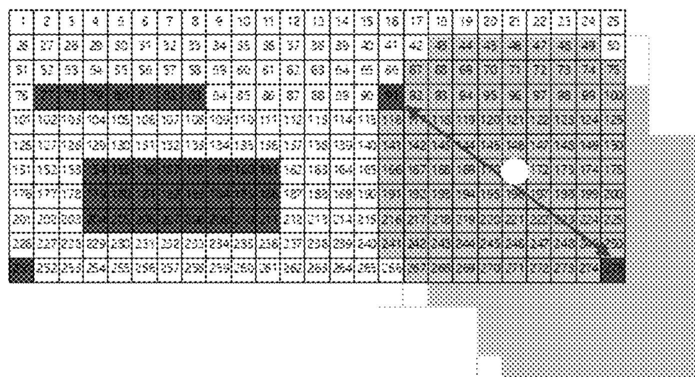

For example, as illustrated in FIG. 29D, in an operation S420, it may be proposed that a specific pixel is turned off. In an example illustrated in FIG. 29D, as a result of the determination, a different turned-on pixel may be included inside respective checking-reference pixel regions of all turned-on pixels other than the 275-th pixel, and thus all turned-on pixels other than the 275-th pixel may satisfy the references specified in the laws. Therefore, when only the 275-th pixel is turned off, the laws are obeyed. Therefore, an image may be proposed to the user in a state where the other pixels are turned on.

Figure 29F:
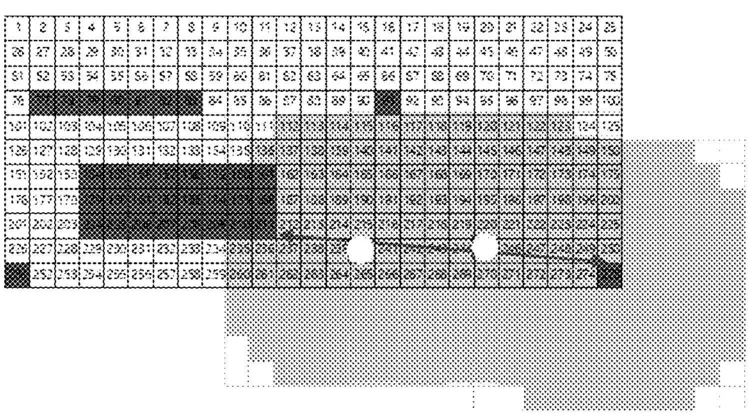

Alternatively, in an example illustrated in FIG. 29F, it may be proposed in an operation S30 that a specific pixel is turned on. For example, it may be proposed that a pixel not yet turned on is turned on in a shortest-distance region between a pixel (the 275-th pixel) of which the checking-reference pixel region does not have a different turned-on pixel and a different adjacent pixel (the 211-st pixel). However, in the example illustrated in FIG. 29F, among pixels positioned at the shortest distance between the 275-th pixel and the 211-st pixel, the 245-th pixel does not satisfy the references specified in the laws. Therefore, in this case, it is desired that it is proposed that in addition to the 245-th pixel, the 240-th pixel adjacent to the 211-st pixel may be turned on.

A so-called set method that is a first method associated with a specific determination algorithm for obeying the laws for the distance between the light emission surfaces, according to an embodiment, is described below with reference to FIGS. 28 to 29C.

Figure 28:
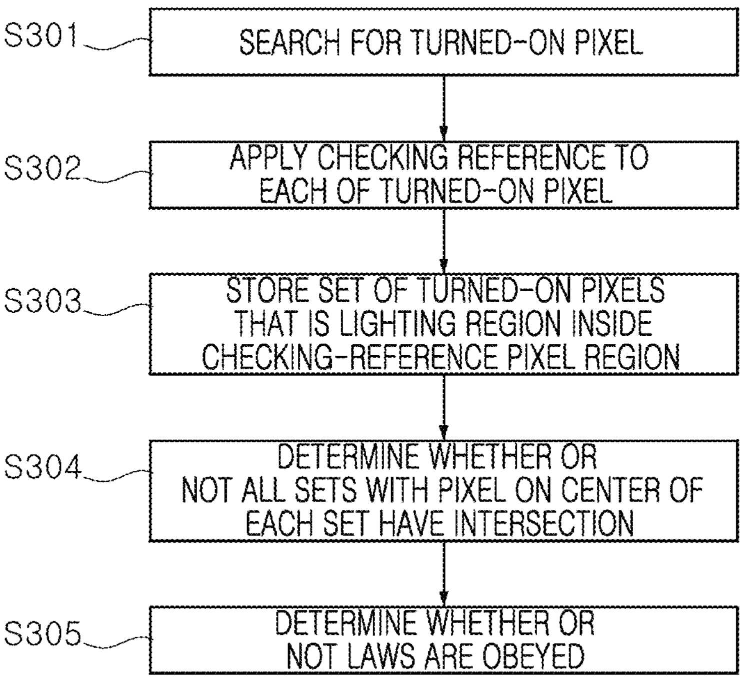
FIG. 28 is a flowchart illustrating a first method for determining whether or not the distance between the light emission surfaces is set in the operations illustrated in FIG. 27, according to an embodiment of the present disclosure.

FIG. 28 is a flowchart illustrating the set method that is the first method. In an operation 301, the controller 40 may search for a pixel, among a plurality of pixels, that is turned on based on the drawn image. In an example illustrated in FIG. 29A, as a result of the search, it is determined that the 77-th to 83-rd pixels, the 91-st pixel, the 154-th to 161-st pixels, the 179-th to 186-th pixels, the 204-th to 211-st pixels, the 251-st pixel, and the 275-th pixel are turned on. A set of the pixels determined to be turned-on may be stored.

In an operations S302, the controller 40, as illustrated in FIG. 29B, may apply checking reference to each of the turned-on pixels, and sets the checking-reference pixel region.

In an operation S303, the set of turned-on pixels that is the lighting region inside the checking-reference pixel region may be stored.

For example, as illustrated in FIG. 29B, in a case where a set of pixels that are turned on inside the checking-reference pixel region with the turned-on 77-th pixel on the center thereof is defined as a [77] set, the [77] set may be expressed as {77 to 82, 154 to 157, 179 to 181, 204, 205}. A [78] set that is a set of pixels that are turned on inside the checking-reference pixel region with the 78-th pixel on the center thereof may be expressed as {77 to 83, 154 to 185, 179 to 182, 204 to 206}.

In an operation S304, it may be determined whether or not all sets with a pixel on the center of each set have an intersection. According to a result of the determination, in an operation 305, it may be determined whether or not the laws are obeyed. For example, in a case where even one set that does not contain an intersection with a different set is present, it may be determined that the laws are not obeyed. On the other hand, in a case where each set contains an intersection with a different set, it may be determined that the laws are obeyed.

The following method may be used as a specific algorithm for determining whether or not an intersection is present.

For example, in a case where an intersection of the [77] set containing relatively small numbers and the [78] set containing relatively great numbers is present, update may be performed on the [78] set to which the [77] set containing the relatively small numbers is added. As a result of the update, the [78] set may be expressed as {77 to 83, 154 to 158, 179 to 182, 204 to 206}. The pixel number 77 indicating the [77] set that is added to the [78] set is deleted from the numbers of the turned-on pixels. Accordingly, the set that contains the numbers of the turned-on pixels may be updated with {78 to 83, 91, 154 to 161, 179 to 186, 204 to 211, 251, 275}. This update may be repeatedly performed on each of the turned-on pixels.

In an example illustrated in FIG. 29C, a [251] set that results from performing update on pixels up to and including the 251-st pixel may be expressed as {77 to 82, 91, 154 to 161, 179 to 186, 204 to 211}. A set that contains the numbers of the turned-on pixels may be expressed as {251, 275}.

A [275] set with the last 275-th pixel turned on after the 251-st pixel on the center thereof may be [275]. Thus, an intersection of a [251] set and a [275] set is not present. Accordingly, the [251] set and the [275] set are not added. Therefore, the 251-st pixel may be not deleted from the set that contains the numbers of the turned-on pixels. Thus, a set that contains the numbers of the finally turned-on pixels may be {251, 275}.

Therefore, in a case where the number of numbers N contained in the set that is to contain the numbers of the finally turned-on pixels may be 1 (that is, in a case where all sets have an intersection), it may be determined that the laws are obeyed. In a case where the number of numbers N may be not 1 (that is, at least one set does not have an intersection), it may be determined that the laws are not obeyed.

Figure 30:
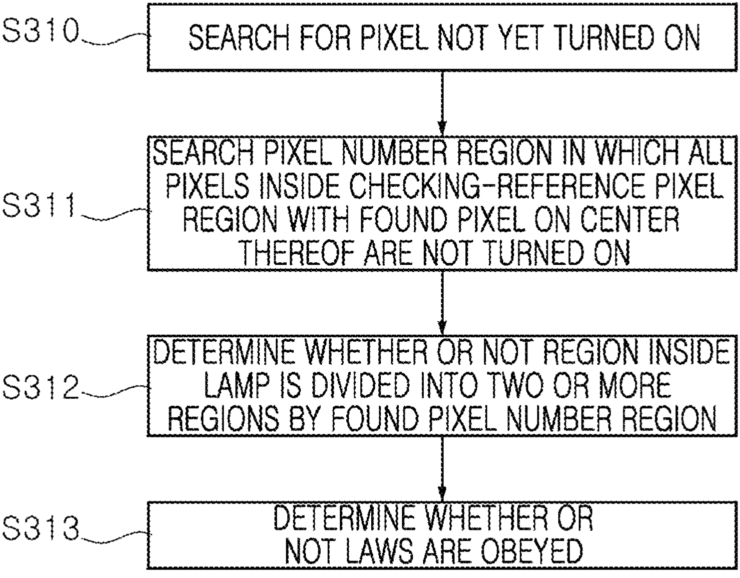
FIG. 30 is a flowchart illustrating a second method for determining whether or not the distance between light emission surfaces is set in the method illustrated in FIG. 27, according to an embodiment of the present disclosure.

A method for making a determination based on a non-lighting region that is a second method associated with a specific determination algorithm for obeying the laws for the distance between the light emission surfaces, according to an embodiment, is described below with reference to FIGS. 30 to 31F.

Figure 31A:
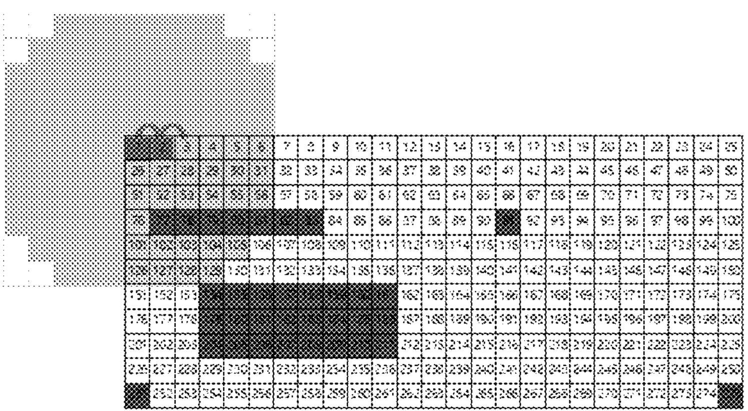
FIG. 31A to 31F are views to illustrate description of the second method illustrated in FIG. 30, according to embodiments of the present disclosure.
Figure 31B:
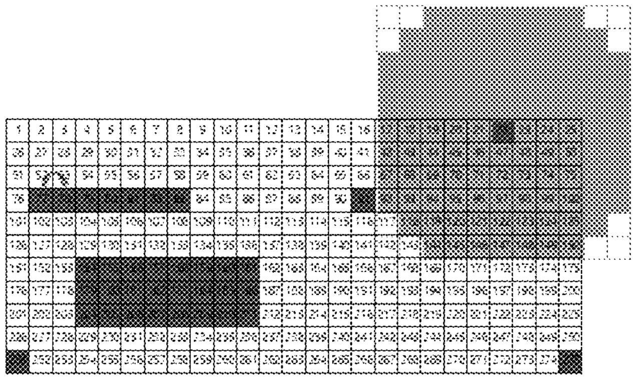

As illustrated in FIG. 31A, in an operation S310, pixels not yet turned on are sequentially searched for, starting from the first pixel. When the pixel not yet turned on is found, in an operation S311, it is checked whether or not all pixels inside the checking-reference pixel region with the found pixel not yet turned on the center thereof are not yet turned on. For example, in FIG. 31A, the first pixel may be not yet turned on, but the 77-th to 81-st pixels inside the checking-reference pixel region with the first pixel on the center thereof are turned on. As illustrated in FIG. 31B, the 22-nd pixel may be not yet turned on, and all pixels inside the checking-reference pixel region with the 22-nd pixel on the center thereof are not yet turned on. In this case, the numbers of the pixels not yet turned on inside the checking-reference pixel region are stored in the storage device.

Figure 31C:
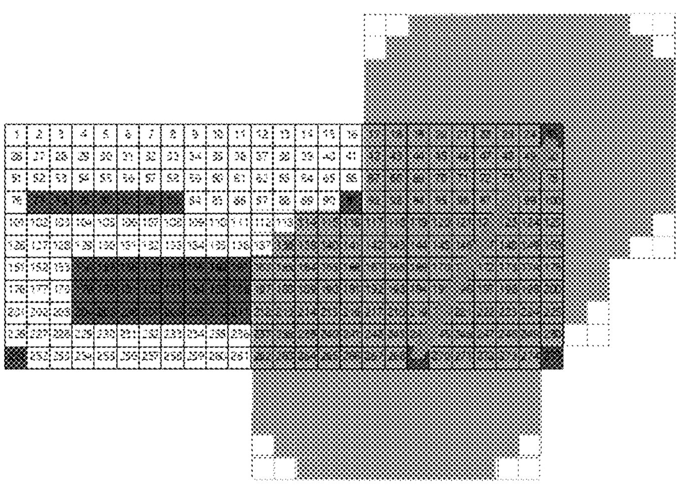

As illustrated in FIG. 31C, in a case where it is checked whether or not all pixels not yet turned on are inside the checking-reference pixel region, in an operation S312, it is determined whether a region inside the vehicle lamp is divided into two or more regions by a number region (a pixel region marked in dark color in FIG. 31C) containing numbers of the registered pixels not yet turned on. In an operation S313, it is determined whether the laws are obeyed.

Figure 31D:
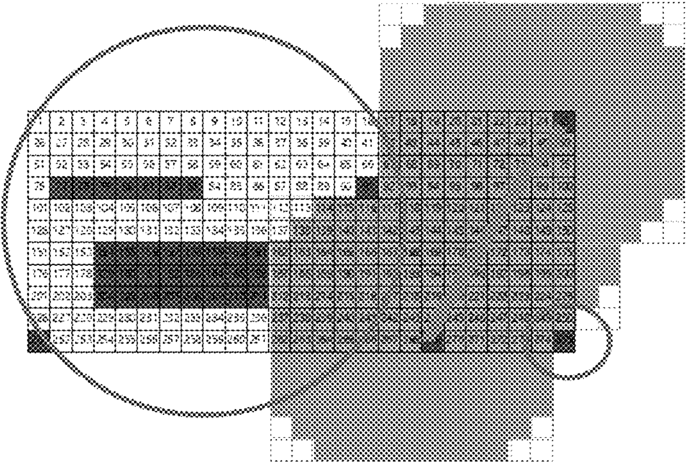

For example, as illustrated in FIG. 31D, the 275-th pixel and a region containing the other pixels are separated by the number region containing the numbers of the registered pixels not yet turned on. In this case, it may be determined that the laws are not obeyed. In a case where the lighting region inside the vehicle lamp is not divided into two or more regions by the number region containing the numbers of the pixels not yet turned on, it may be determined that the laws are obeyed.

Figure 31E:
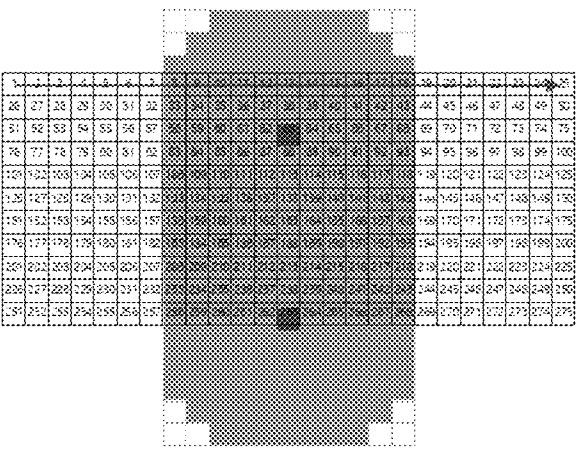
Figure 31F:
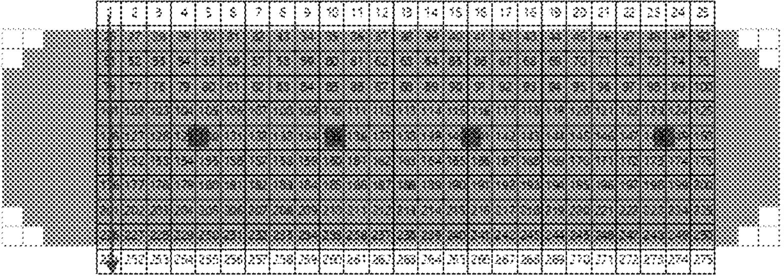

In embodiments, methods illustrated in FIGS. 31E and 31F may be used as techniques for checking whether or not the region inside the vehicle lamp is divided into two or more regions by the number region containing the numbers of the registered pixels not yet turned on.

In the method illustrated in FIG. 31E, in order to check whether or not the region is divided into two or more regions in the transverse direction, it may be checked whether or not the first pixel, the second pixel, the third pixel, and so forth up to the 25-th pixel in this order are turned while passing through a group not yet turned on. Likewise, it may be checked whether or not the 26-th pixel, the 27-th pixel, the 28-th, and so forth up to the 50-th pixel in this order are turned on while passing through a group not yet turned on.

In the method illustrated in FIG. 31F, in order to check whether or not the region is divided into two or more regions in the longitudinal direction, it may be checked whether or not the first pixel, the 26-th pixel, the 51-st pixel, and so forth up to the 251-st pixel in this order are turned on while passing through a group not yet turned on. Likewise, it may be checked whether or not the second pixel, the 27-th pixel, the 52-nd, and so forth up to the 252-nd pixel in this order are turned on while passing through a group not yet turned on.

Figure 32:
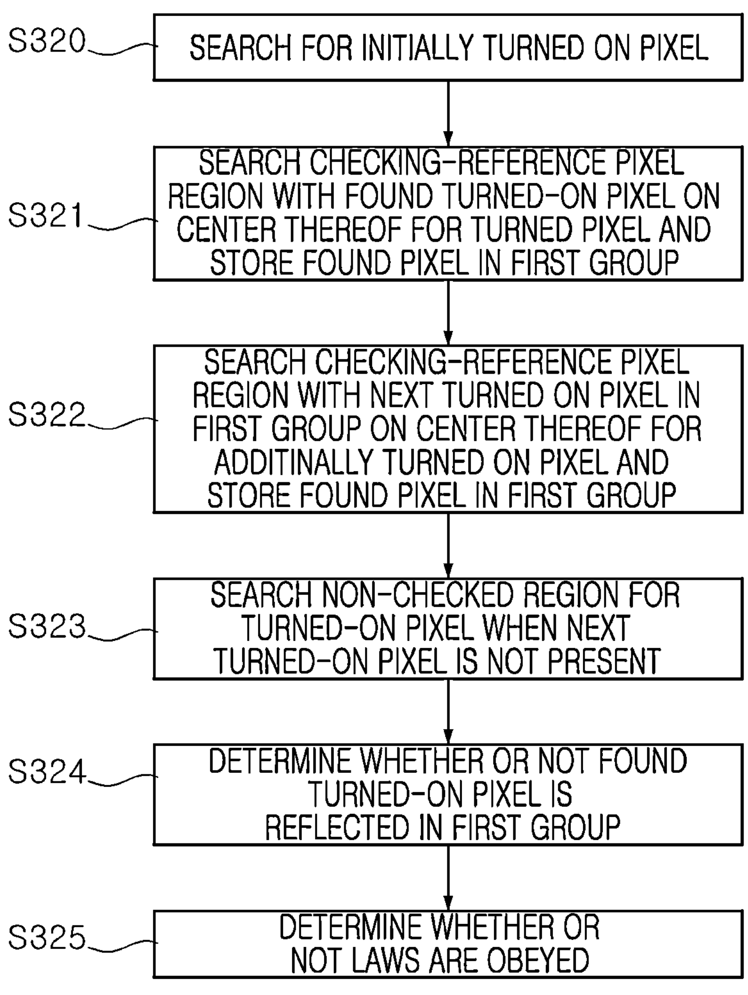
FIG. 32 a flowchart illustrating a third method for determining whether or not the distance between the light emission surfaces is set in the method illustrated in FIG. 27, according to an embodiment of the present disclosure.

A method for making a determination based on the lighting region, as a third method associated with a specific determination algorithm for obeying the laws for the distance between the light emission surfaces, according to an embodiment, is described below with reference to FIGS. 32 to 33E.

Figure 33A:
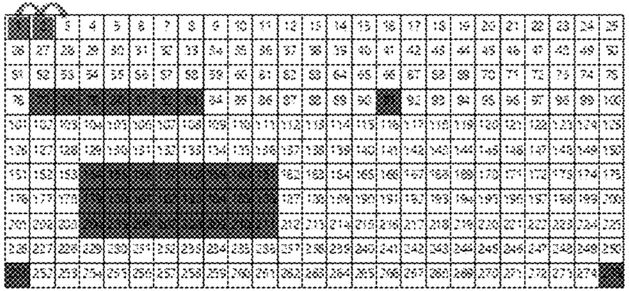
FIGS. 33A to 33E are views to illustrate detailed description of the third method illustrated in FIG. 32, according to embodiments of the present disclosure.

As illustrated in FIG. FIG. 33A, in an operation S320, turned-on pixels are sequentially searched for, starting from the first pixel. When the turned-on pixel is found, in an operation S321, the checking-reference pixel region with the found turned-on pixel on the center thereof may be searched for a turned-on pixel, and the found pixel may be stored in a first group.

Figure 33B:
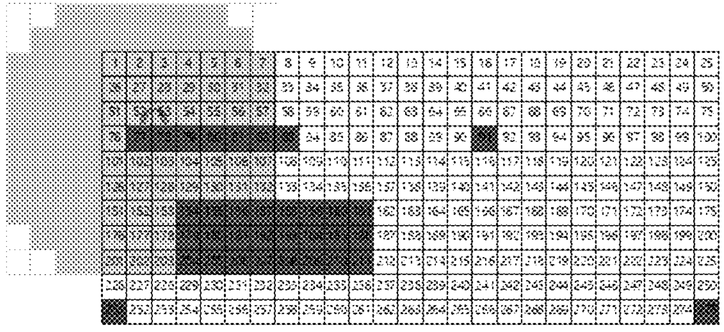

For example, when the 77-th pixel is found as an initially turned-on pixel in FIG. 33B, the turned-on pixels (the 78-th to 82nd pixels, the 154-th to 157-th pixels, the 179-th to 181-st pixel, and the 204-th to 250-th pixels in FIG. 33B) inside the checking-reference pixel region with the 77-th pixel on the center thereof are stored in the first group.

In an operation S322, the checking-reference pixel region with the next turned-on pixel in the first group on the center thereof may be searched for an additionally turned-on pixel, and the found pixel may be stored in the first group. In FIG. 33B, the next turned-on pixel in the first group may be the 78-th pixel. Therefore, among turned-on pixels inside the checking-reference pixel region with the 78-th pixel on the center thereof, additionally turned-on pixels (the 83-rd pixel, the 158-th pixel, or the like) that are not stored in the first group are stored in the first group.

This technique may be repeatedly applied to the next pixel in the first group. In a case where an additionally turned-on pixel is not present inside the checking-reference pixel region with the next pixel on the center thereof, a checking reference may be applied to the second next pixel.

Figure 33C:
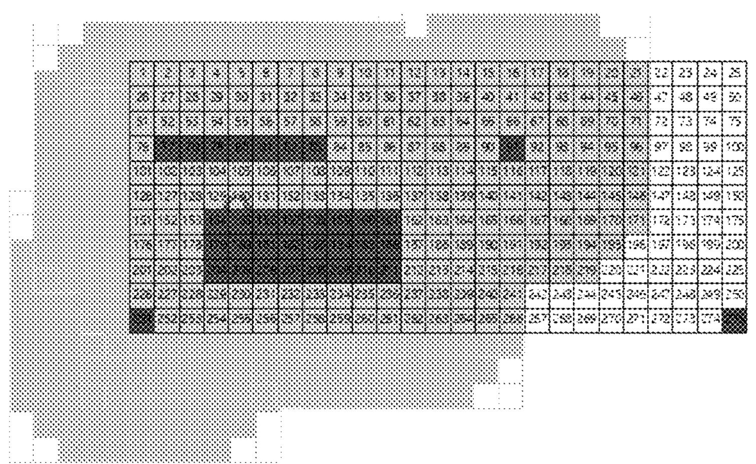
Figure 33D:
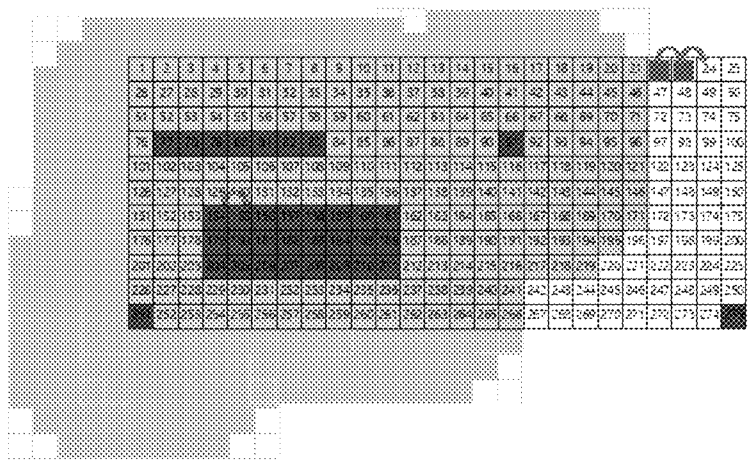

In a case where, as illustrated in FIG. 33C, no further next pixel is present, as illustrated in FIG. 33D, in an operation S323, a non-checked region may be searched for a turned-on pixel. In a case where a turned-on pixel is not present inside the non-checked region, it may be determined that the rules are obeyed.

Figure 33E:
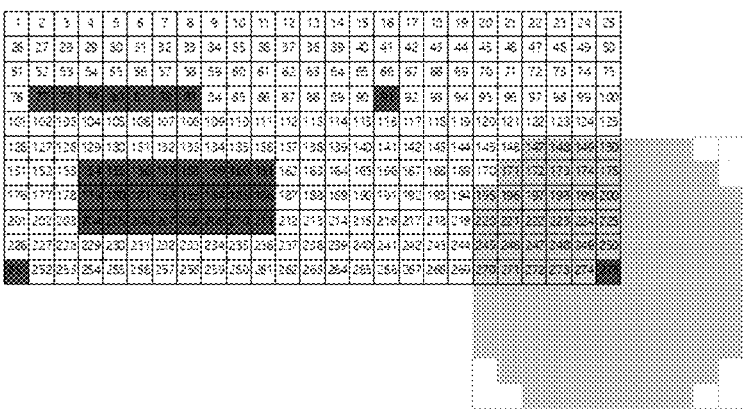

In a case where as in an example illustrated in FIG. 33E, it is checked that the 275-th pixel is turned on, it is checked whether or not the 275-th pixel and a turned-on pixel inside the checking-reference pixel region with the 275-th pixel on the center thereof belong to the first group. When it is checked that as illustrated in FIG. 33E, the turned-on pixel does not belong to the first group, it is determined that the laws are not obeyed.

Figure 34:
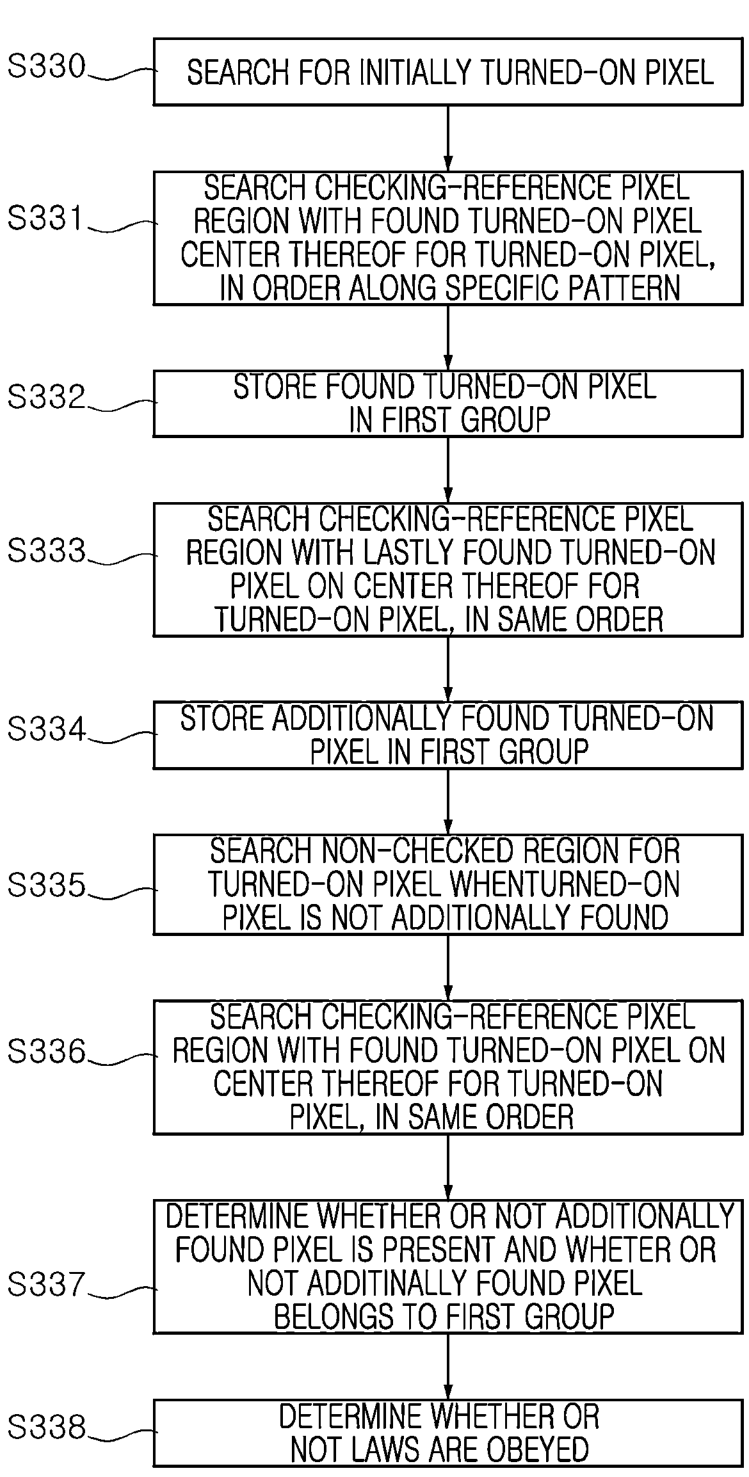
FIG. 34 is a flowchart illustrating a fourth method for determining whether or not the distance between the light emission surfaces is set in the operations illustrated in FIG. 27, according to an embodiment of the present disclosure.

A so-called jumping method, as a fourth method associated with a specific determination algorithm for obeying the laws for the distance between the light emission surfaces, according to an embodiment, is described with reference to FIGS. 34 to 35K.

In the third method described above, a process of checking all the next pixels in the first group by applying the checking reference may be performed, and thus an amount of load for computation may be increased. Therefore, in the fourth method, the checking reference may be applied to only a specific turned-on pixel inside the checking-reference pixel region, and thus the amount of load for computation may be reduced.

Figure 35A:
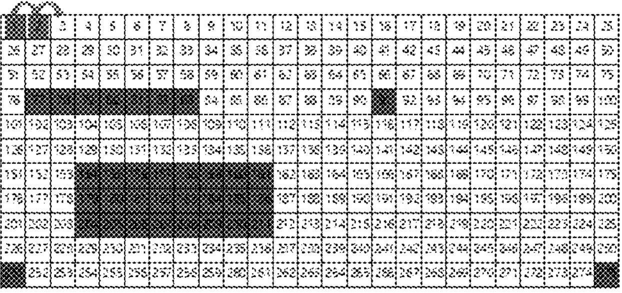
FIGS. 35A to 35K are views to illustrate detailed description of the fourth method illustrated in FIG. 34, according to an embodiment of the present disclosure.

As illustrated in FIG. 35A, in an operation S330, turned-on pixels are sequentially searched for, starting from the first pixel. When the turned-on pixels are found, in an operation S331, the checking-reference pixel region with the found turned-on pixel on the center thereof may be searched for a turned-on pixel, in order along a specific pattern.

Figure 35B:
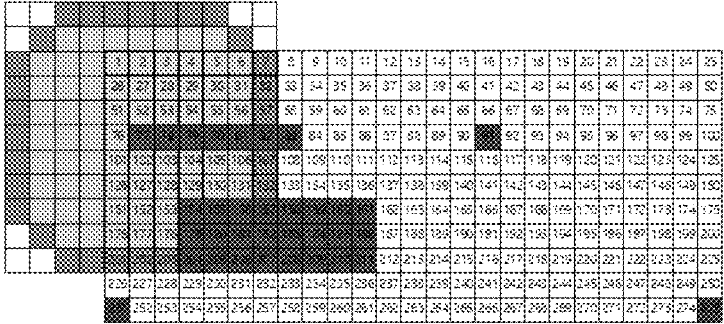
Figure 35C:
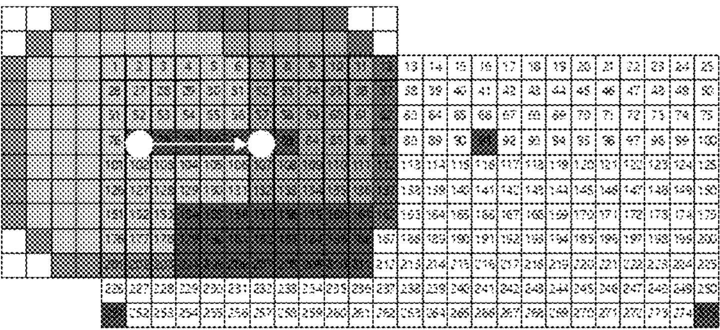
Figure 35D:
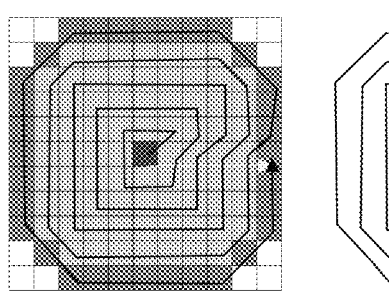
Figure 35D:
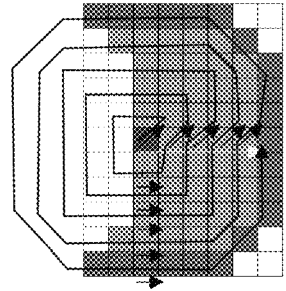

For example, in an example illustrated in FIG. 35D, the checking-reference pixel region with the found turned-on pixel on the center thereof may be searched for turned-on pixels, in order along a helical pattern whose radius increases counterclockwise with respect to the turned-on pixel. In this case, the turned-on pixel that is lastly found may be positioned at the rightmost position from the turned-on pixel on the center. However, the pattern illustrated in FIG. 35D is only an example. In addition, the order of conducting a search in the clockwise direction may be determined. A pattern may be set in such a manner that the turned-on pixel that is lastly found may be positioned at the uppermost, lowermost, or leftmost position instead of the rightmost position.

For example, in an example illustrated in FIG. 35B, the 77-th pixel may be found as an initially turned-on pixel. When the checking-reference pixel region with the 77-th pixel on the center thereof is searched for a turned-on pixel, along a pattern illustrated in FIG. 35D, the pixel that is lastly found may be the 82-nd pixel. When the search is finished, the turned-on pixels (the 78-th to 82-th pixels, the 154-th to 157-th pixels, the 179-th to 181-th pixels, and the 204-th pixel to 250-th pixels in FIG. 35C) that are found are stored in the first group.

As illustrated in FIG. 35C, in an operation S333, the checking-reference pixel region may be searched for a turned-on pixel, along the same pattern as previously, with the lastly found pixel (the 82-nd pixel in the present example) inside the checking-reference pixel region on the center thereof. As illustrated in FIG. 35C, the region that is already checked by applying the checking reference to the previous pixel (the 77-th pixel in the present example) may not be searched for a turned-on pixel. In an operation S334, the additional turned-on pixels (the 83-rd pixel, the 158-th pixel, or the like) not stored in the first group, when found as a result of the search, are stored in the first group.

Figure 35E:
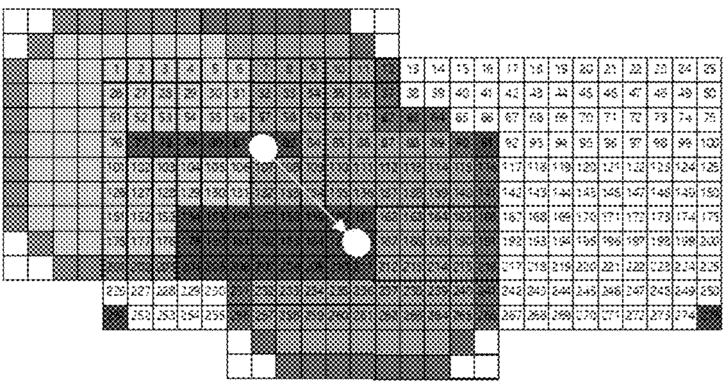
Figure 35F:
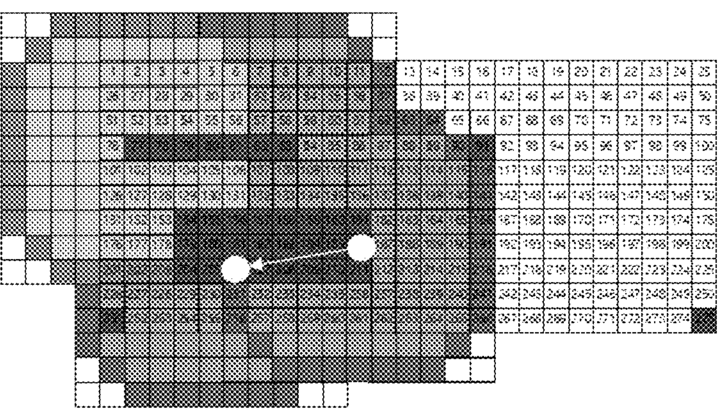
Figure 35G:
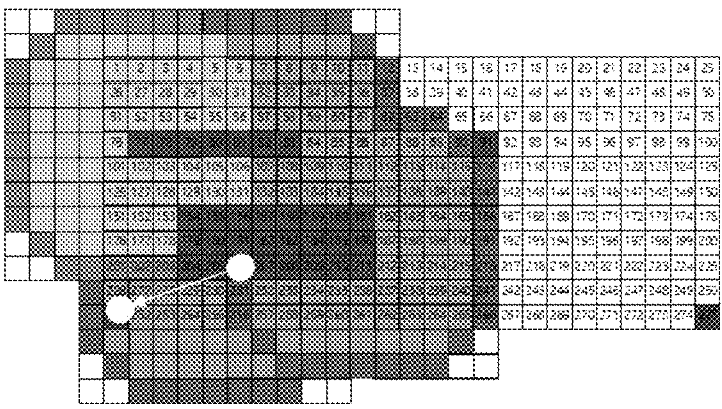

This process may be repeatedly performed. As illustrated in FIG. 35E, when the checking reference is applied, in the same pattern, to the 82-nd pixel, the 186-th pixel may be lastly found as the turned-on pixel. In this case, when the checking reference is applied, in the same pattern, to the 186-th pixel, as illustrated in FIG. 35F, the 206-th pixel may be lastly found. Moreover, when the checking reference is applied, in the same pattern, to the 206-th pixel, as illustrated in FIG. 35G, the 251-st pixel may be lastly found. Likewise, it is checked whether or not the turned-on pixel is additionally present inside the checking reference pixel region, by applying the checking reference to the turned-on pixel that is lastly found, and the turned-on pixel that is additionally found may be stored in the first group.

Figure 35H:
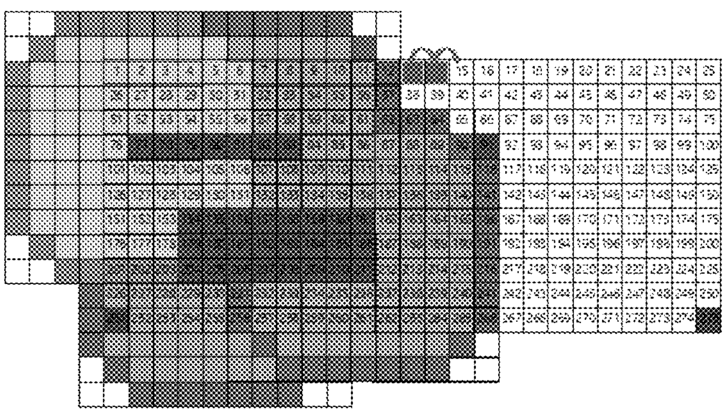

In an example illustrated in FIG. 35G, in the case of the 251-st pixel, the additional turned-on pixel that does not belong to the first group may be not checked inside the checking-reference pixel region. In this case, as illustrated in FIG. 35H, in an operation S335, the non-checked region may be searched for a turned-on pixel.

When the turned-on pixel (the 91-st pixel in an example in FIG. 35I) is found inside the non-checked region as a result of the search, in an operation S336, the checking-reference pixel region may be searched for the turned-on pixel by applying the checking reference to the found turned-on pixel. In a case where the turned-on pixel is checked, in an operation S337, it is checked whether the checked turned-on pixel belong to the first group. In a case where the checked turned-on pixel belongs to the first group, the checked turned-on pixel (the 161-th pixel in FIG. 35I) may be stored in the first group.

In a case where the checked turned-on pixel does not belong to the first group, it is checked whether or not a different turned-on pixel is present inside the checking-reference pixel region. In a case where the checked turned-on pixel belongs to the first group, the checked turned-on pixel, along with the turned-on pixel that is previously checked, may be stored in the first group. In a case where it is checked that the additionally checked turned-on pixel also does not belong to the first group, the checking-reference pixel region may be repeatedly checked for an additional turned-on pixel.

Figure 35I:
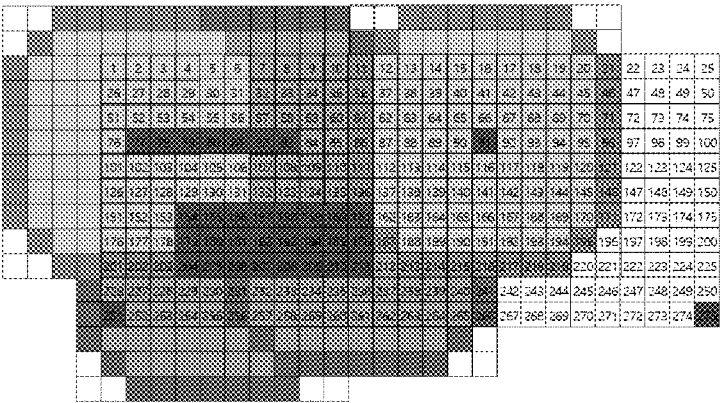
Figure 35J:
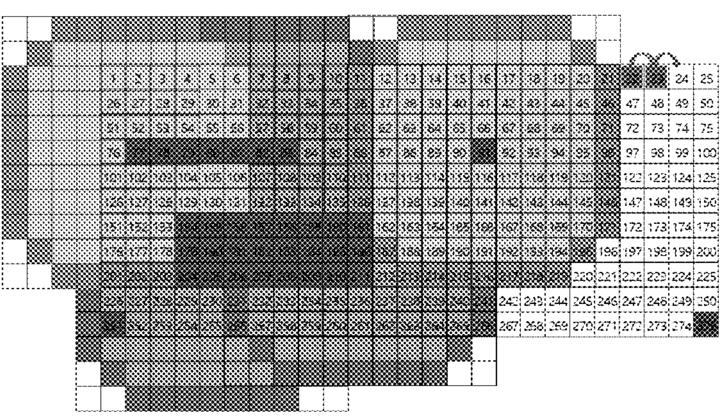

In an example illustrated in FIG. 35I, in the case of the 91-st pixel, the 161-st pixel belongs to the first group. Therefore, the 91-st pixel and the 161-st pixel are stored in the first group. An additional turned-on pixel may be not present inside the checking-reference pixel region with the 91-st pixel on the center thereof. Therefore, as illustrated in FIG. 35J, the non-checked region may be re-searched for a turned-on pixel.

Figure 35K:
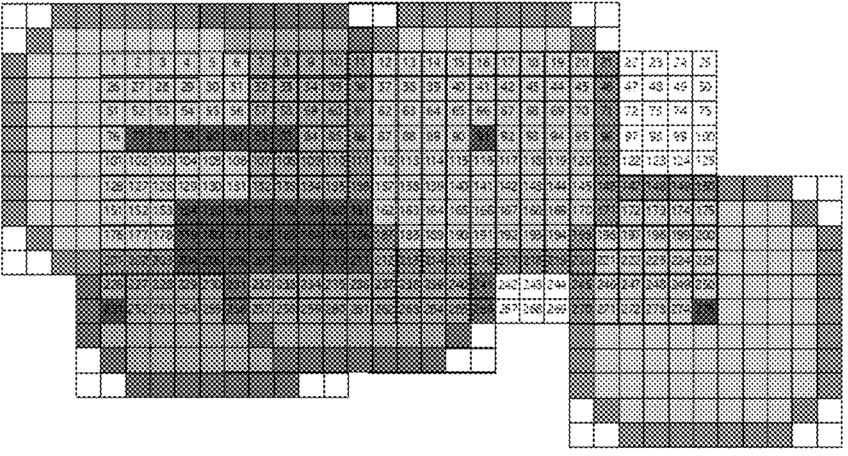

As a result of the search, as illustrated in FIG. 35K, the 275-th pixel may be a lastly found turned-on pixel. In this case, the checking-reference pixel region may be searched for a turned-on pixel by applying the checking reference to the 275-th pixel. As illustrated in FIG. 35K, an additional turned-on pixel may be not present inside the checking-reference pixel region with the 275-th pixel on the center thereof. Therefore, it is checked that all the pixels inside the checking-reference pixel regions do not belong to the first group. In this case, it is determined that the laws are not obeyed.

As described above, in the case of the vehicle lamp, in each country, there is a law that stipulates a requirement for a minimum light emission area of the vehicle lamp on a per-function basis in order to recognize the user. In order to determine whether or not to obey this law, a total area of the turned-on pixels based on the drawn image may be derived. Then, it may be checked whether or not the total area of the turned-on pixels that constitute the lamp performing the illumination function satisfies the requirement for the minimum light emission area that is stipulated in each country. In the methods of personalizing a vehicle lamp according to embodiments of the present disclosure, the information on the number of the pixels and the size of each of the pixels may be input. Therefore, when the number of the pixels that are turned on and the size of each of the pixels that are turned on are used, based on the drawn image, it may be determined whether or not the personalized lamp obeys the laws for the minimum light emission area.

When it is determined based on the drawn image that the laws for the minimum light emission area are obeyed, the lamp may be turned on using the drawn image. In a case where the laws for the minimum light emission area are not obeyed, the number of the pixels that need to be turned on may be computed in order to obey the laws for the minimum light emission area, and the computed number of the pixels may be notified to the user. Accordingly, the user who receives information on the computed number of the pixels may modify the drawn image and may re-input the modified drawn image. When the user inputs the modified drawn image, a total area of the turned-on pixels may be recomputed, and then it may be determined whether or not the requirement for the minimum light emission area is required.

The above description is merely illustrative of the technical idea of the present disclosure. It should be apparent to a person having ordinary skill in the art to which the present disclosure pertains that various alterations and modifications may be made to the embodiments of the present disclosure without departing from the nature and gist of the present disclosure.

Therefore, the embodiments of the present disclosure are for describing the technical idea of the present disclosure, rather than limiting it, and do not impose any limitation on the scope of the technical idea of the present disclosure. Accordingly, the scope of protection of the present disclosure should be defined by the following claims. All technical ideas that fall within the scope equivalent thereto should be interpreted to be included within the scope of the claims of the present disclosure.

What is claimed is:

1. A method for personalizing a vehicle lamp of a vehicle, the method comprising:

obtaining, by a controller, an image comprising a plurality of pixels that implements a vehicle lamp based on an input by a user, wherein the controller includes a processor programmed to perform data processing for personalizing the vehicle lamp based on a user command and a storage device configured to store information generated by the processor;

performing, by the controller, digital datafication of the obtained image;

determining, by the controller, whether a reference associated with the vehicle lamp satisfies a predetermined light distribution reference based on data resulting from the digital datafication; and applying, by the controller, the obtained image to the vehicle lamp when it is determined that the predetermined light distribution reference is satisfied, wherein determining whether the reference associated with the vehicle lamp satisfies the predetermined light distribution reference includes:

multiplying a pixel light distribution value, corresponding to each pixel in the obtained image, that results when the vehicle lamp is turned on in a shape of the obtained image, by a weighted value based on data resulting from a conversion of the obtained image, adding up results of the multiplication, and deriving total light distribution of the pixels that results when brightness of the turned-on vehicle lamp is in proportion to brightness of the obtained image, and comparing the derived total light distribution of the pixels against the predetermined light distribution reference, and determining whether the derived total light distribution of the pixels satisfies the predetermined light distribution reference.

2. The method of claim 1, wherein performing digital datafication of the obtained image includes converting the obtained image into amount-of-color data that correspond to respective pixels by performing digital datafication thereof.

3. The method of claim 2, further comprising:

displaying, by the controller, a reason that the obtained image fails to satisfy the predetermined light distribution reference when it is determined that the derived total light distribution of the pixels does not satisfy the predetermined light distribution reference.

4. The method of claim 2, further comprising:

deriving, by the controller, a similarity image satisfying the predetermined light distribution reference, as an image similar to the obtained image, using a deep learning model, when it is determined that the derived total light distribution of the pixels does not satisfy the predetermined light distribution reference; and applying, by the controller, the derived similarity image to the vehicle lamp.

5. The method of claim 2, wherein obtaining the image, in response to the input by the user, comprises drawing the image in accordance with a number of the pixels that implement the vehicle lamp.

6. The method of claim 2, wherein obtaining the image comprises:

receiving a first image input by the user, wherein the first image is unrelated to combination of the pixels that constitute the vehicle lamp; and generating a second image by converting the first image into the plurality of pixels for rasterization, wherein the second image is in accordance with the combination of the pixels that constitute the vehicle lamp.

7. The method of claim 6, wherein generating the second image includes:

converting red, green, and blue (RGB) colors of the first image into gray scales of the pixels of the second image.

8. The method of claim 2, wherein the amount-of-color data are values that are preset as data values that represent 256 levels, respectively, ranging from level 0 to level 255 and are stored.

9. The method of claim 2, further comprising:

registering, by the controller, the obtained image with an online platform by uploading when it is determined that the derived total light distribution of the pixels satisfies the predetermined light distribution reference; and matching, by the controller, copyright information and proprietary right information of the registered image with each other and issuing a non-fungible token (NFT), based on a blockchain, that provides a proprietary right to the registered image.

10. The method of claim 9, further comprising:

receiving a request for use of the registered image from at least one terminal for service use, owned by the user, that is connected to a network based on the blockchain;

comparing the copyright information and the proprietary right information that are matched with the registered image the use of which is requested and information of the user with each other; and applying the registered image, the use of which is requested, to the vehicle lamp when the copyright information and the proprietary right information that are matched with the registered image, the use of which is requested, are consistent with the information of the user.

11. The method of claim 9, further comprising:

receiving a request for use of the registered image from at least one terminal for service use, owned by the user, that is connected to a network based on the blockchain;

comparing the copyright information and the proprietary right information that are matched with the registered image the use of which is requested and information of the user with each other;

charging a usage fee for the use of the registered image to the user when the copyright information and the proprietary right information that are matched with the registered image, the use of which is requested, are not consistent with the information of the user;

applying the registered image to the vehicle lamp of the user when it is determined that the usage fee for the use of the registered image is paid by the user; and providing payment of a usage fee for a service associated with the registered image to a creator of the registered image based on the charged usage fee.

12. The method of claim 9, wherein the NFT is issued to an account for the online platform through which a proprietary right to a vehicle of the user is identified.

13. The method of claim 3, further comprising:

deriving a similarity image, as an image similar to the obtained image, that satisfies the predetermined light distribution reference, using a deep learning model, when it is determined that the derived total light distribution of the pixels does not satisfy the predetermined light distribution reference; and causing the derived similarity image to be displayed to the user and waiting for the user to re-input an image.

14. The method of claim 13, further comprising:

re-deriving total light distribution of the pixels for the re-input image, comparing the re-derived total light distribution of the pixels against the predetermined light distribution reference, and determining whether the re-derived total light distribution of the pixels satisfies the predetermined light distribution reference; and applying the re-input image to the vehicle lamp when it is determined that the re-derived total light distribution of the pixels satisfies the predetermined light distribution reference.

15. The method of claim 13, further comprising:

receiving a request for use of an image registered with an online platform from at least one terminal for service use, owned by the user, that is connected to a network based on a blockchain when it is determined that the derived total light distribution of the pixels does not satisfy the predetermined light distribution reference;

comparing copyright information and proprietary right information that are matched with the registered image the use of which is requested and information of the user with each other;

charging a usage fee for the use of the registered image to the user when the copyright information and the proprietary right information that are matched with the registered image, the use of which is requested, are not consistent with the information of the user;

applying the registered image to the vehicle lamp of the user when it is determined that the usage fee for the use of the registered image is paid by the user; and providing payment of a usage fee for a service associated with the registered image to a creator of the registered image based on the charged usage fee.

16. The method of claim 2, wherein the vehicle lamp performs at least one of a low-beam functions, a high-beam function, a sub-low-beam function, a backup function, a DRL display function, a position display function, a direction indication function, a vehicle-stop display function, or an emergency display function, or a combination thereof.

17. The method of claim 1, further comprising:

receiving, by the controller, positional information of an area in which the vehicle currently travels, wherein determining whether the reference associated with the vehicle lamp satisfies the predetermined light distribution reference further includes determining the reference for the vehicle lamp based on the received positional information of the area.

18. The method of claim 1, further comprising:

determining, by the controller, a lighting-capable region of the vehicle lamp inside a vehicle, wherein determining whether the reference associated with the vehicle lamp satisfies the predetermined light distribution reference includes determining whether installing the vehicle lamp for illumination is obeyed based on pixel data information of the vehicle lamp that results from a conversion for the digital datafication.

19. The method of claim 18, wherein determining the lighting-capable region of the vehicle lamp includes:

obtaining information associated with dimensions of the vehicle; and computing the lighting-capable region of the vehicle lamp based on the obtained information.

20. The method of claim 19, wherein:

obtaining the information associated with dimensions of the vehicle further comprises obtaining a vehicle image that is to appear in a state where the vehicle lamp is turned on, and computing of the lighting-capable region of the vehicle lamp comprises computing the lighting-capable region of the vehicle lamp based on the information on the dimensions of the vehicle and the vehicle image.

21. The method of claim 1, wherein determining whether the reference associated with the vehicle lamp satisfies the predetermined light distribution reference includes determining whether a distance between light emission surfaces of the vehicle lamp and/or an area of the light emission surfaces obeys references based on pixel data information of the vehicle lamp that results from the conversion for the digital datafication.

22. The method of claim 21, wherein determining whether the reference associated with the vehicle lamp satisfies the predetermined light distribution reference includes:

setting a checking-reference pixel region of a predetermined size, with each of the pixels constituting the vehicle lamp on the center thereof, determining whether a different turned-on pixel is present inside the checking-reference pixel region with the turned-on pixel on the center thereof, and determining whether the reference associated with the vehicle lamp satisfies the predetermined light distribution reference, based on a result of the determination.

23. The method of claim 22, wherein determining whether the different turned-on pixel is present inside the checking-reference pixel region with the turned-on pixel on the center thereof includes:

storing a set of turned-on pixels inside the checking-reference pixel region with the turned-on pixel on the center thereof, and determining whether an intersection is present between the stored sets of the turned-on pixels.

24. The method of claim 22, wherein determining whether the different turned-on pixel is present inside the checking-reference pixel region with the turned-on pixel on the center thereof includes:

searching for a pixel not yet turned on that constitutes the vehicle lamp, searching for a region in which all pixels inside the checking-reference pixel region with a found pixel not yet turned on on the center thereof are not yet turned on, and determining whether a region inside the vehicle lamp is divided into two or more regions by the found region in which all the pixels are not yet turned on.

25. The method of claim 22, wherein determining whether the different turned-on pixel is present inside the checking-reference pixel region with the turned-on pixel on the center thereof includes:

searching for a turned-on pixel, searching the checking-reference pixel region with the found turned-on pixel on the center thereof for a turned-on pixel and storing the found turned-on pixel in a first group, searching the checking-reference pixel region with the next turned-on pixel in the first group on the center thereof for an additionally turned-on pixel and adding the found additionally turned-on pixel to the first group, searching a non-checked region for a turned-on pixel when the next turned-on pixel is not present, and determining whether the found turned-on pixel is reflected in the first group.

26. The method of claim 22, wherein determining whether the different turned-on pixel is present inside the checking-reference pixel region with the turned-on pixel on the center thereof includes:

searching for a turned-on pixel, searching the checking-reference pixel region with the found turned-on pixel on the center thereof for a turned-on pixel, in order along a specific pattern, searching the checking-reference pixel region with the lastly found turned-on pixel on the center thereof for a turned-on pixel, in the same order, storing an additionally found turned-on pixel in a first group, searching a non-checked region for a turned-on pixel when the turned-on pixel is not additionally found, and determining whether the turned-on pixel is found in the non-checked region as a result of the search and whether the found turned-on pixel belongs to the first group.

27. The method of claim 21, wherein determining whether the reference associated with the vehicle lamp satisfies the predetermined light distribution reference includes:

deriving a total area of the turned-in pixels, and determining whether the derived total area satisfies the predetermined light distribution reference.

28. The method of claim 21, wherein determining whether the reference associated with the vehicle lamp satisfies the predetermined light distribution reference includes:

providing to the user a proposal that some turned-on pixels of the turned-on pixels are turned off or some pixels inside a non-lighting region are turned on, when it is determined that the obtained image does not satisfy the reference associated with the vehicle lamp.

29. The method of claim 1, wherein performing digital datafication of the obtained image includes:

converting the obtained image into red, green, and blue (RGB) data that correspond to the pixels, respectively, by digitally datafying the obtained image, and wherein determining whether the reference associated with the vehicle lamp satisfies the predetermined light distribution reference includes:

determining whether a ratio between each color that constitute the RGB data satisfies a predetermined color intensity reference.

* * * * *